United States Patent
Kobayashi

(10) Patent No.: US 11,214,225 B2
(45) Date of Patent: Jan. 4, 2022

(54) PASSENGER PROTECTION APPARATUS

(71) Applicant: Autoliv Development AB, Vargarda (SE)

(72) Inventor: Yuto Kobayashi, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 52 days.

(21) Appl. No.: 16/635,723

(22) PCT Filed: Jul. 6, 2018

(86) PCT No.: PCT/JP2018/025614
§ 371 (c)(1),
(2) Date: Jan. 31, 2020

(87) PCT Pub. No.: WO2019/026538
PCT Pub. Date: Feb. 7, 2019

(65) Prior Publication Data
US 2021/0129787 A1     May 6, 2021

(30) Foreign Application Priority Data
Aug. 1, 2017   (JP) .............................. JP2017-149400

(51) Int. Cl.
*B60R 21/233*     (2006.01)
*B60R 21/207*     (2006.01)
(Continued)

(52) U.S. Cl.
CPC .......... *B60R 21/233* (2013.01); *B60R 21/207* (2013.01); *B60R 21/2346* (2013.01);
(Continued)

(58) Field of Classification Search
CPC ................ B60R 21/233; B60R 21/207; B60R 21/23138; B60R 21/2346; B60R 2021/23146; B60R 2021/23332
See application file for complete search history.

(56) References Cited

U.S. PATENT DOCUMENTS 5,913,536 A * 6/1999 Brown .............. B60R 21/23138
                                                      280/730.2
6,065,772 A * 5/2000 Yamamoto ............ B60R 21/207
                                                      280/730.2
(Continued)

FOREIGN PATENT DOCUMENTS

CA     2993843 A1 * 8/2018 ............. B60R 21/26
DE     102010039882 A1 * 3/2011 ....... B60R 21/23138
(Continued)

OTHER PUBLICATIONS

International Search Report of the International Searching Authority for PCT/JP2018/025614 dated Sep. 18, 2018.
(Continued)

*Primary Examiner* — Karen Beck
(74) *Attorney, Agent, or Firm* — Harness, Dickey & Pierce, P.L.C.; Stephen T. Olson

(57) ABSTRACT

[Problem] To provide a side airbag apparatus capable of quickly and properly restraining a passenger in the initial stage of deploying an airbag, along with a passenger protection apparatus including this side airbag apparatus.
[Resolution means] A side airbag apparatus employed in a passenger protection apparatus according to the present invention includes: an airbag for restraining a passenger when expanded and deployed; and an inflator for supplying expansion gas to the airbag. The airbag includes: a first chamber which houses the inflator and is deployed outside in the vehicle width direction of the frame side wall part; a second chamber which is deployed inside in the vehicle
(Continued)

width direction of the frame side wall part with respect to this first chamber; and an internal expanding part which is arranged in the second chamber and expands at least on the rear side of the vehicle in the second chamber via the gas flowing out from the first chamber. In addition, the first chamber is deployed such that at least a portion thereof, as seen from the vehicle side, overlaps the frame side wall part, while the second chamber is configured to be expandable via the gas flowing out from the internal expanding part.

14 Claims, 22 Drawing Sheets

(51) Int. Cl.
    *B60R 21/231*     (2011.01)
    *B60R 21/2346*     (2011.01)

(52) U.S. Cl.
    CPC ............... *B60R 21/23138* (2013.01); *B60R 2021/23146* (2013.01); *B60R 2021/23332* (2013.01)

(56) References Cited

U.S. PATENT DOCUMENTS

| | | | |
|---|---|---|---|
| 8,596,675 B2 * | 12/2013 | Kwon | B60R 21/233 280/730.2 |
| 9,994,181 B1 * | 6/2018 | Dubaisi | B60R 21/207 |
| 10,343,638 B2 * | 7/2019 | Fukawatase | B60R 21/237 |
| 10,377,337 B2 * | 8/2019 | Kunisada | B60R 21/207 |
| 10,518,738 B2 * | 12/2019 | Kobayashi | B60R 21/233 |
| 10,668,887 B2 * | 6/2020 | Fukawatase | B60R 21/23138 |
| 2001/0045732 A1 * | 11/2001 | Taubenberger | B60R 21/18 280/733 |
| 2005/0087959 A1 * | 4/2005 | Heuschmid | B60R 21/2346 280/728.2 |
| 2011/0241322 A1 | 10/2011 | Nozaki et al. | |
| 2012/0091695 A1 * | 4/2012 | Richez | B60R 21/207 280/729 |
| 2012/0217731 A1 * | 8/2012 | Baba | B60R 21/233 280/730.2 |
| 2014/0035264 A1 * | 2/2014 | Fukushima | B60R 21/23138 280/730.2 |
| 2014/0062069 A1 * | 3/2014 | Fukawatase | B60R 21/207 280/730.2 |
| 2015/0097359 A1 | 4/2015 | Rickenbach | |
| 2015/0321638 A1 * | 11/2015 | Sugimoto | B60R 21/261 280/729 |
| 2015/0367804 A1 * | 12/2015 | Fujiwara | B60R 21/23138 280/730.2 |
| 2016/0200280 A1 * | 7/2016 | Fujiwara | B60N 2/4279 280/729 |
| 2017/0129444 A1 * | 5/2017 | Fukawatase | B60R 21/2338 |
| 2017/0174174 A1 * | 6/2017 | Ohno | B60R 21/235 |
| 2017/0182963 A1 * | 6/2017 | Hiraiwa | B60R 21/2338 |
| 2017/0225640 A1 * | 8/2017 | Ohno | B60R 21/239 |
| 2017/0334390 A1 * | 11/2017 | Song | B60R 21/2338 |
| 2018/0118150 A1 * | 5/2018 | Kwon | B60R 21/207 |
| 2018/0334130 A1 * | 11/2018 | Mihm | B60R 21/16 |
| 2019/0047504 A1 * | 2/2019 | Sugishima | B60R 21/233 |
| 2019/0061671 A1 * | 2/2019 | Jang | B60R 21/2338 |
| 2019/0061675 A1 * | 2/2019 | Kwon | B60R 21/233 |
| 2019/0084516 A1 * | 3/2019 | Fukawatase | B60R 21/2338 |
| 2019/0256038 A1 * | 8/2019 | Rathgeb | B60R 21/23138 |
| 2021/0122325 A1 * | 4/2021 | Hwangbo | B60R 21/26 |
| 2021/0213904 A1 * | 7/2021 | Parker | B60R 21/207 |

FOREIGN PATENT DOCUMENTS

| | | | | |
|---|---|---|---|---|
| DE | 102011084093 A1 * | 4/2012 | ........ | B60R 21/233 |
| JP | 2010-188891 A | 9/2010 | | |
| JP | 2014-31096 A | 2/2014 | | |
| JP | 2016-68789 A | 5/2016 | | |
| KR | 20170131129 A * | 11/2017 | ........ | B60R 21/01512 |
| WO | 2010/076881 A1 | 7/2010 | | |
| WO | WO-2018211894 A1 * | 11/2018 | ........ | B60R 21/23138 |
| WO | WO-2020162065 A1 * | 8/2020 | ........ | B60R 21/233 |

OTHER PUBLICATIONS

English Translation of International Search Report of the International Searching Authority for PCT/JP2018/025614 dated Sep. 18, 2018.

* cited by examiner

[FIG. 1]
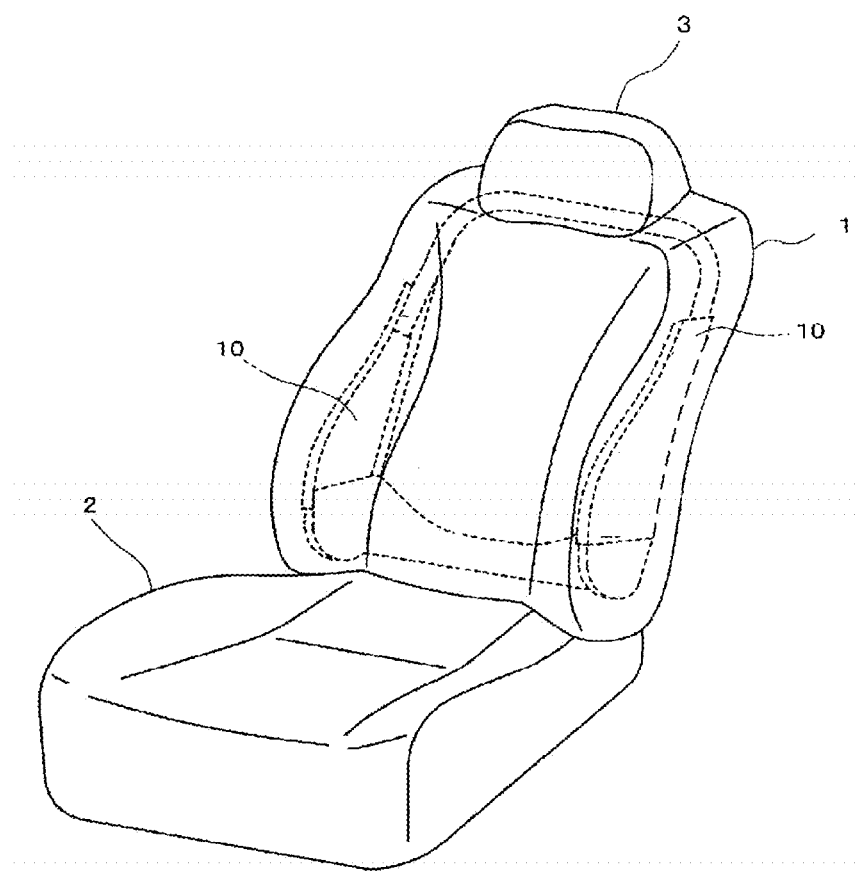

[FIG. 2]
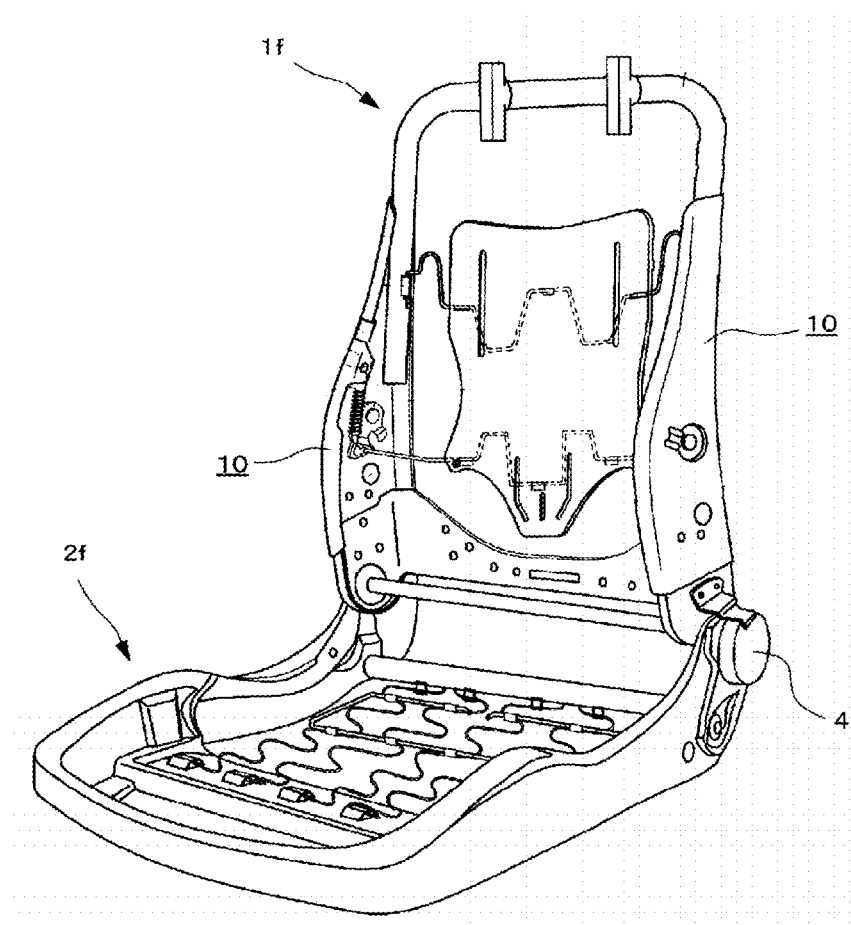

[FIG. 3]
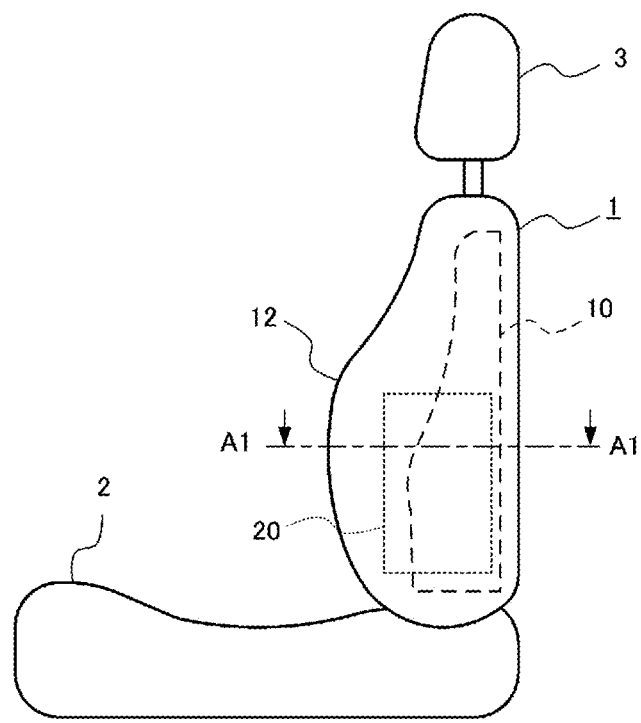
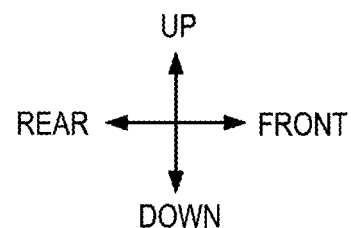

[FIG. 4]
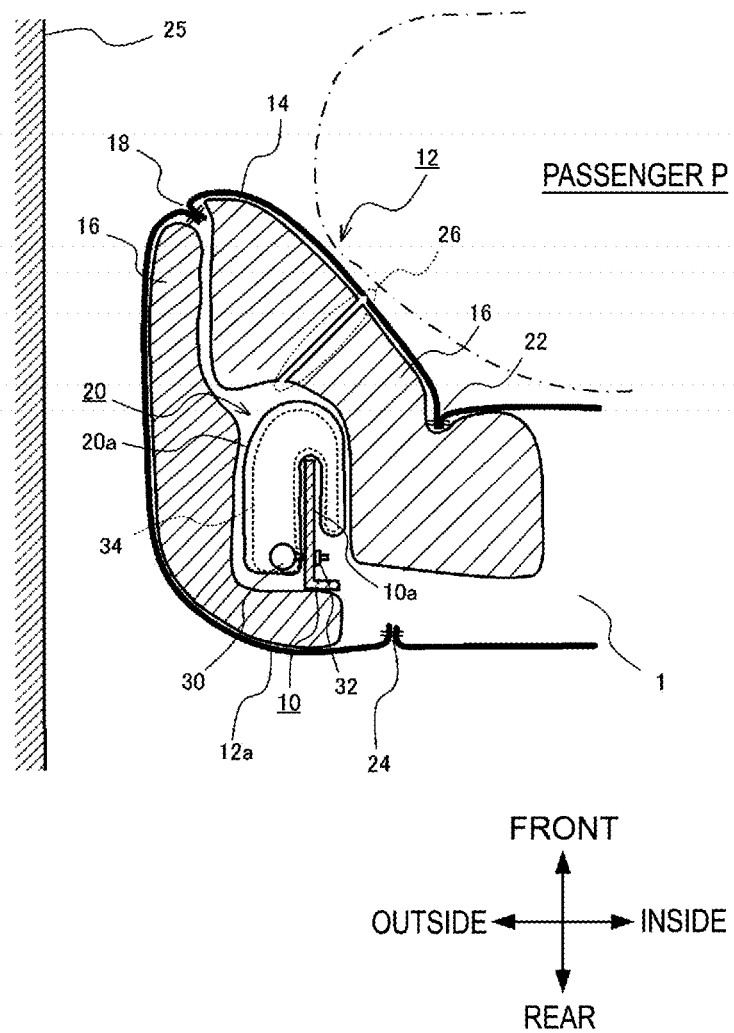

[FIG. 5]
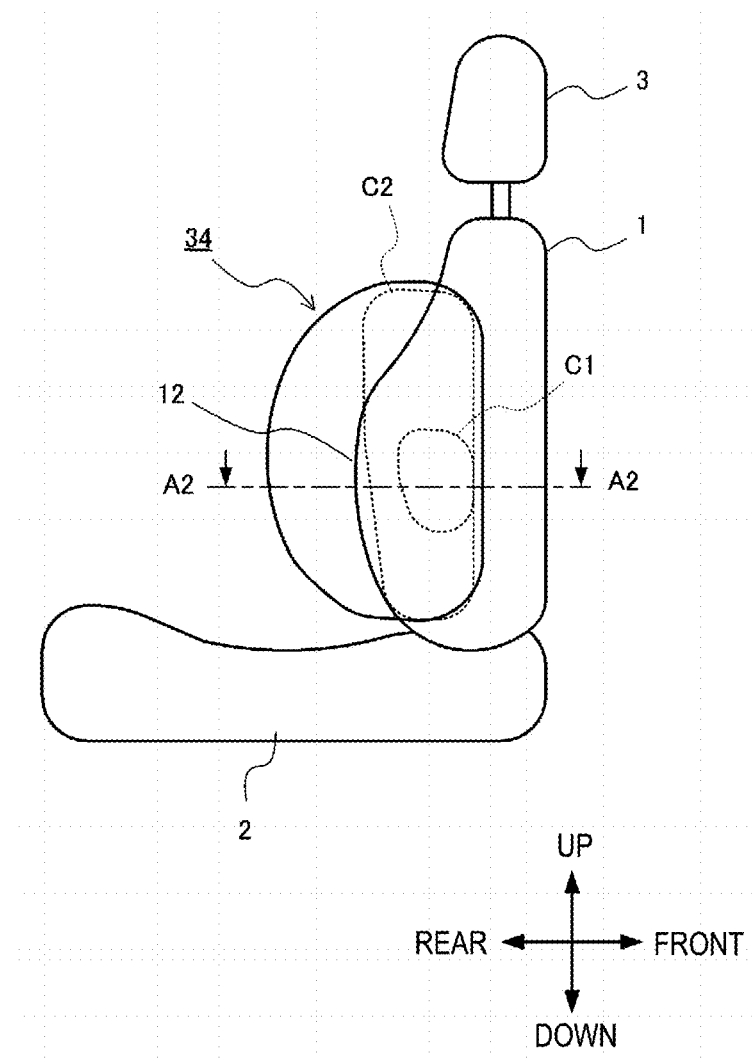

[FIG. 6]
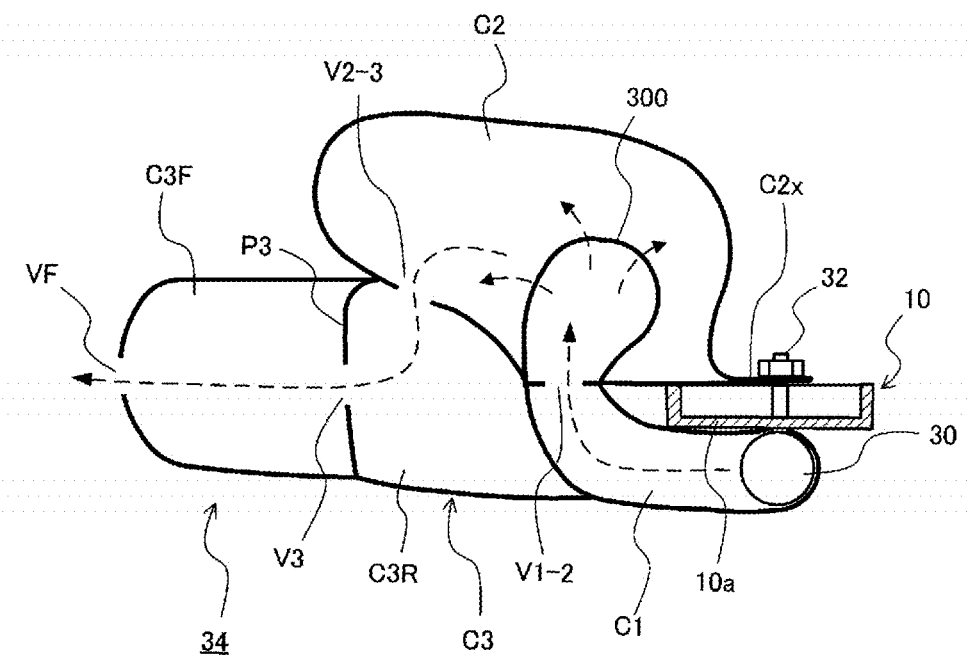
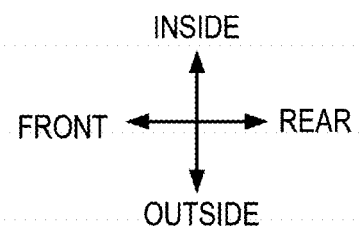

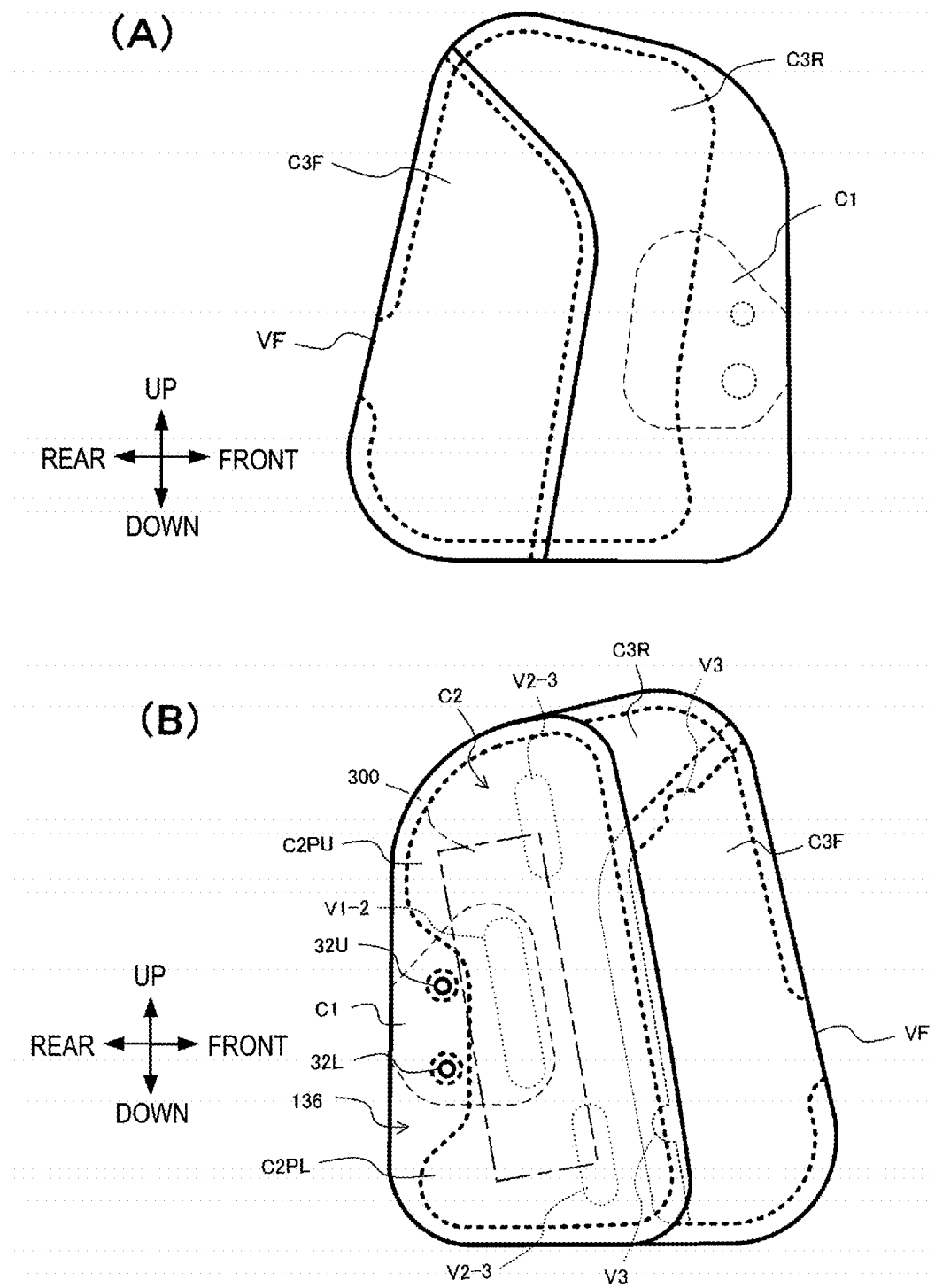
[FIG. 7]

[FIG. 8]
EXAMPLE 1
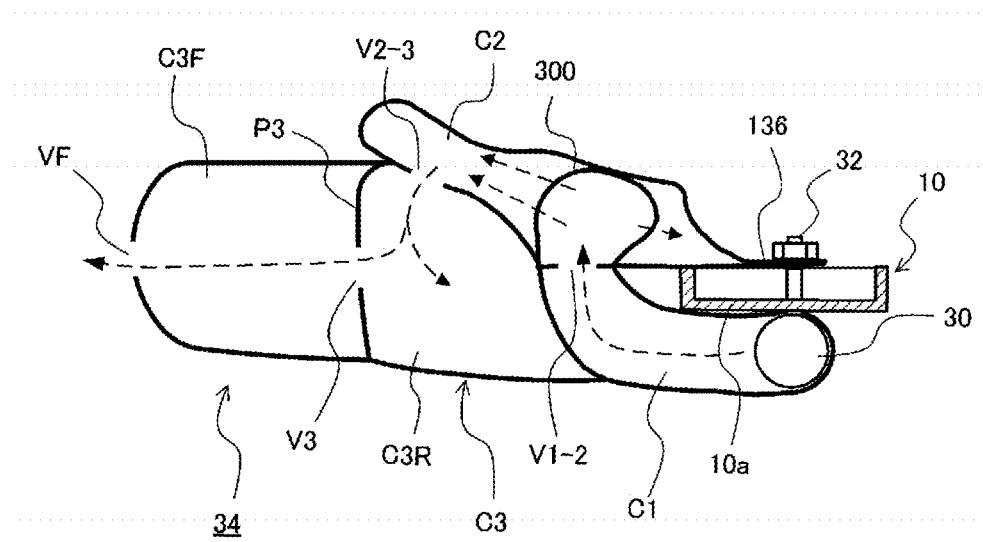
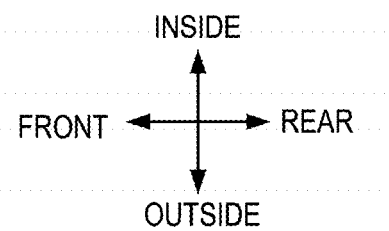

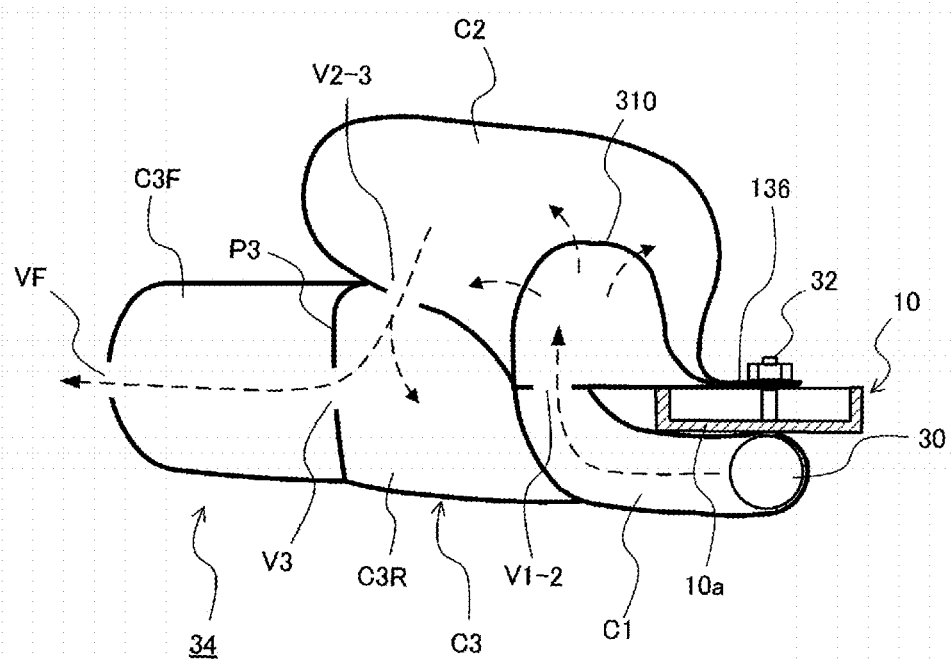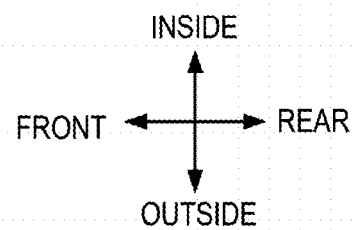

[FIG. 10]
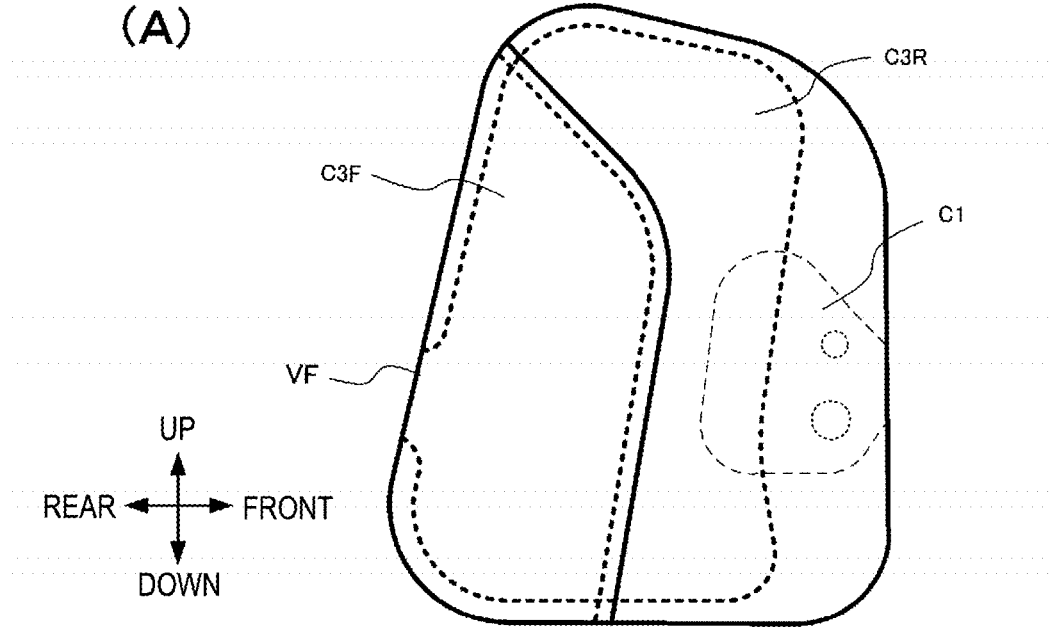
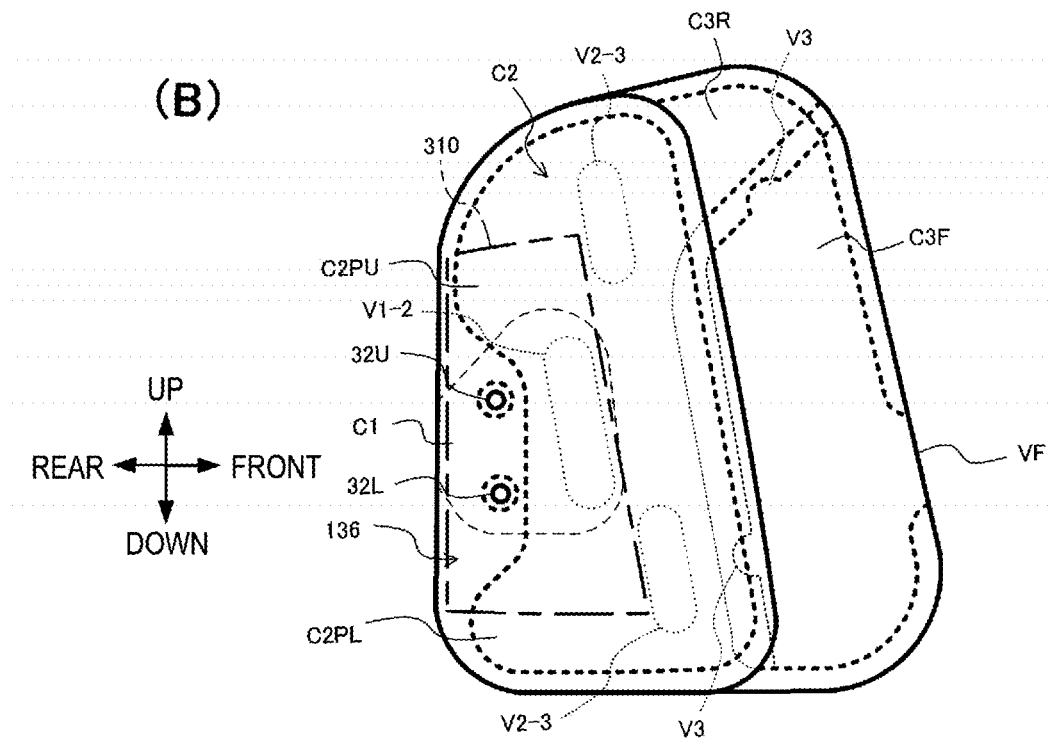

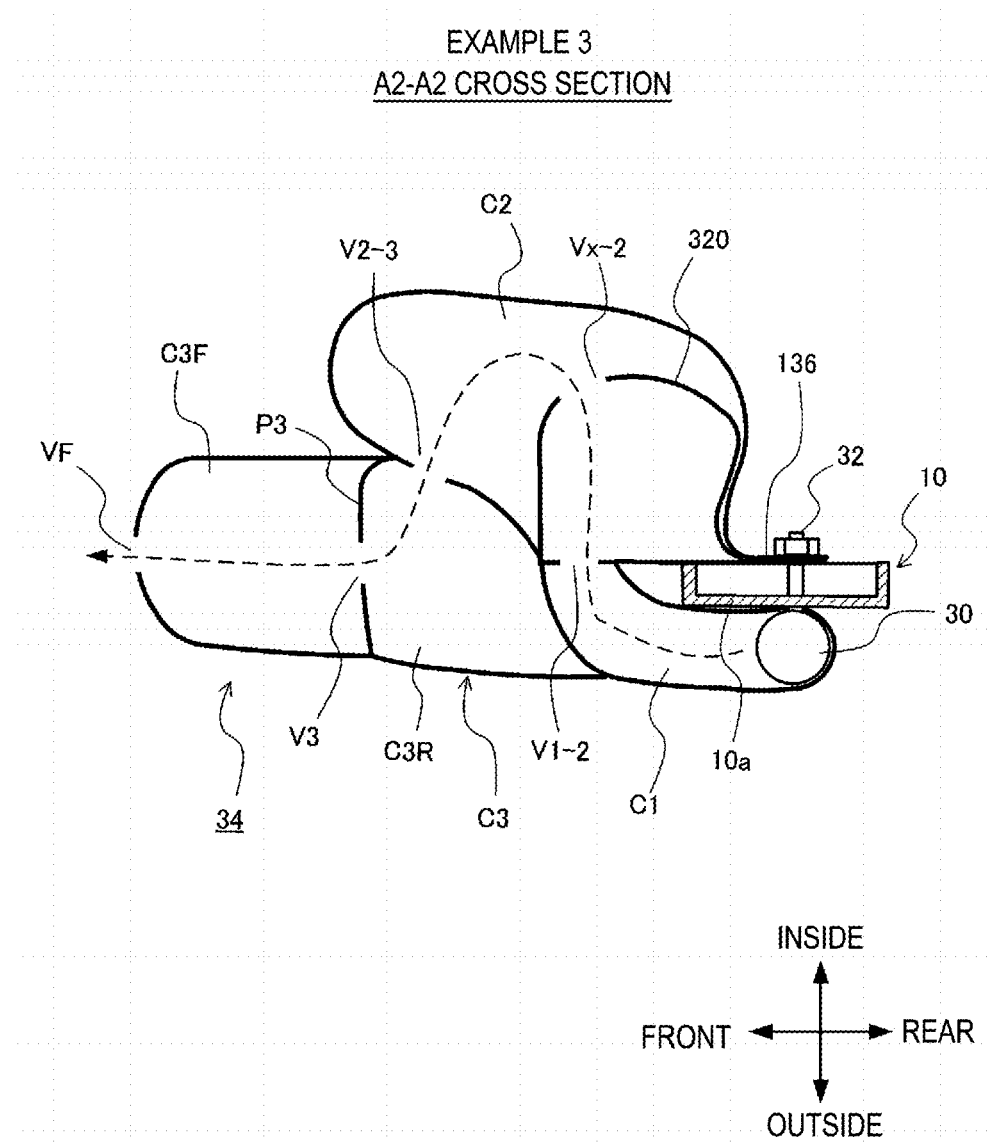

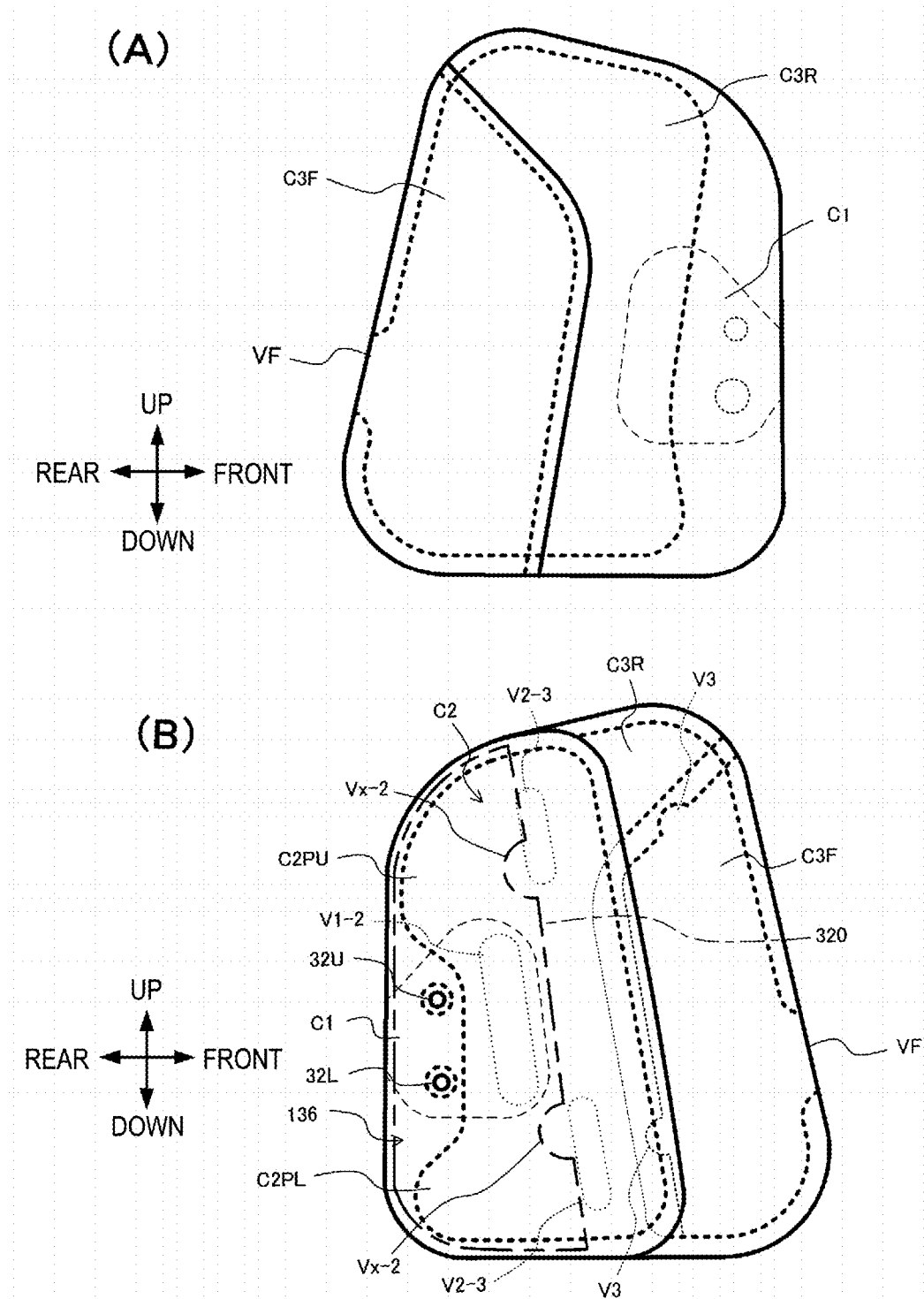
[FIG. 12]

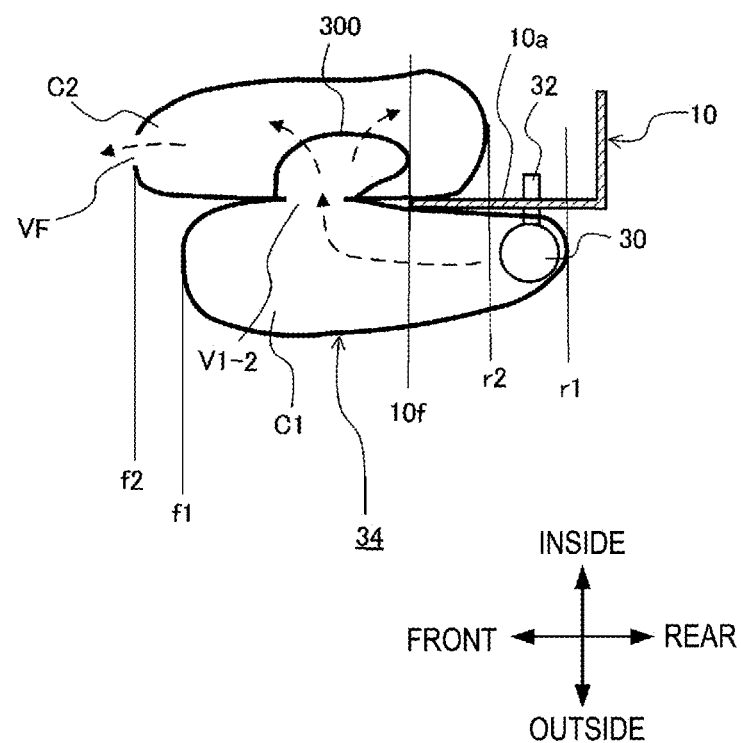

[FIG. 14]
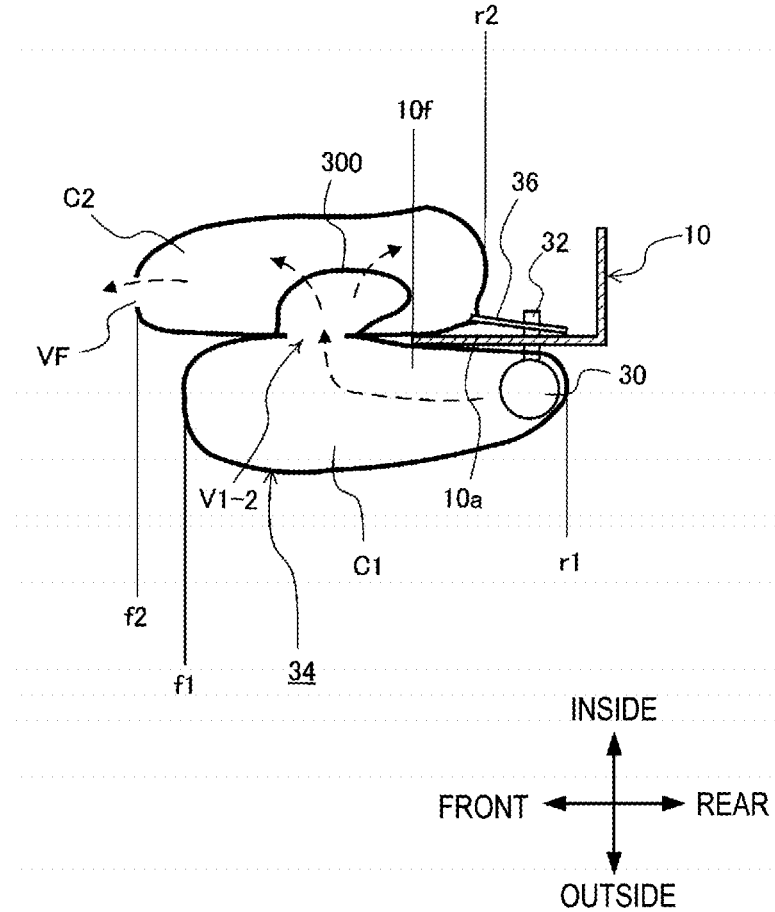

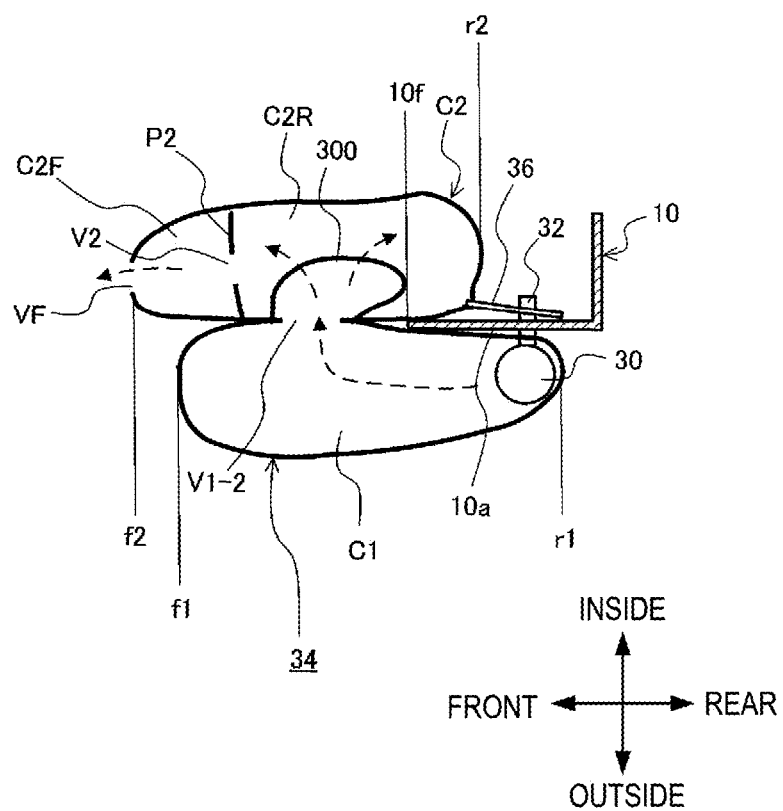

[FIG. 16]
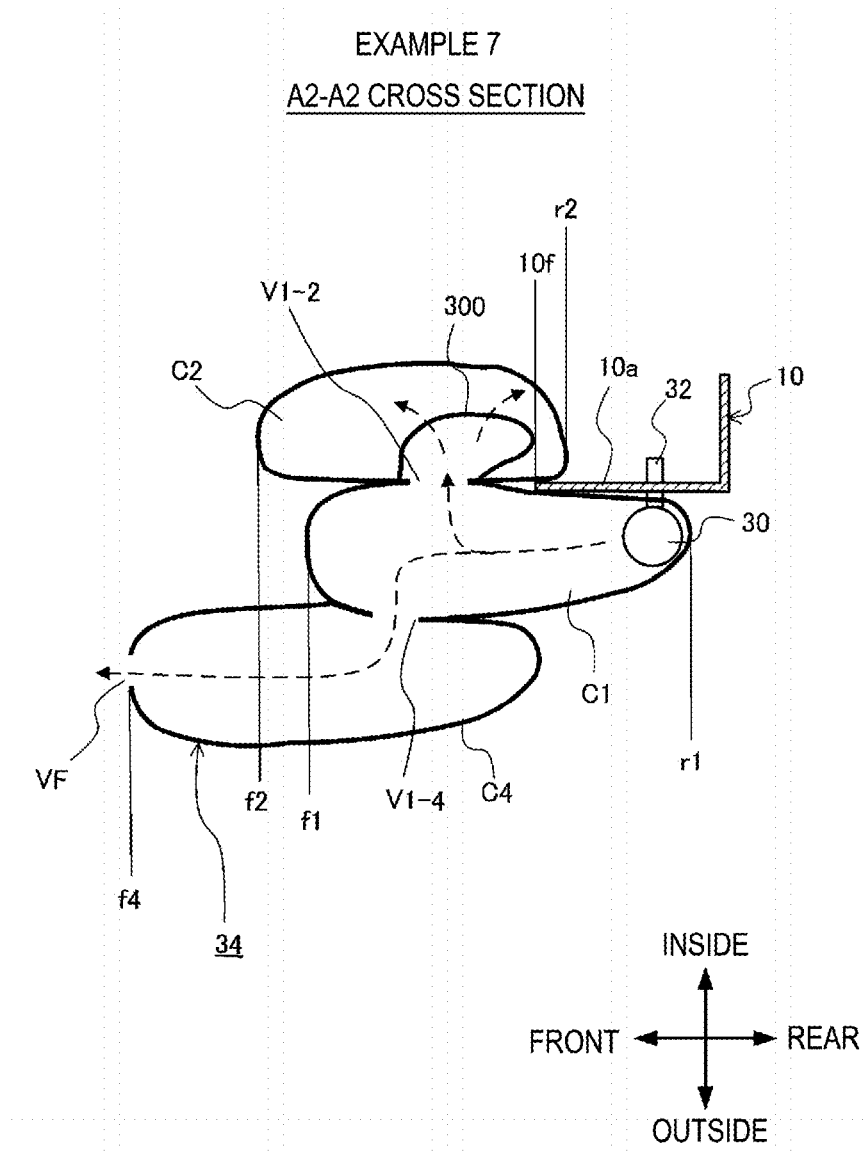

[FIG. 17]
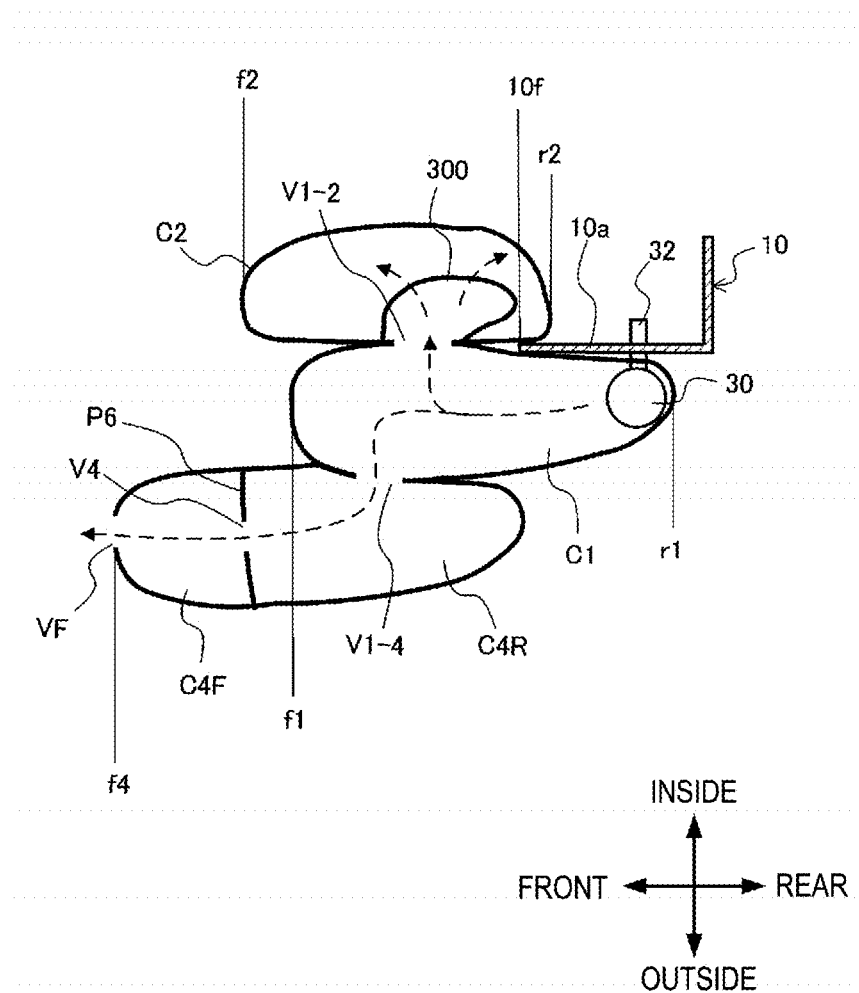

[FIG. 18]
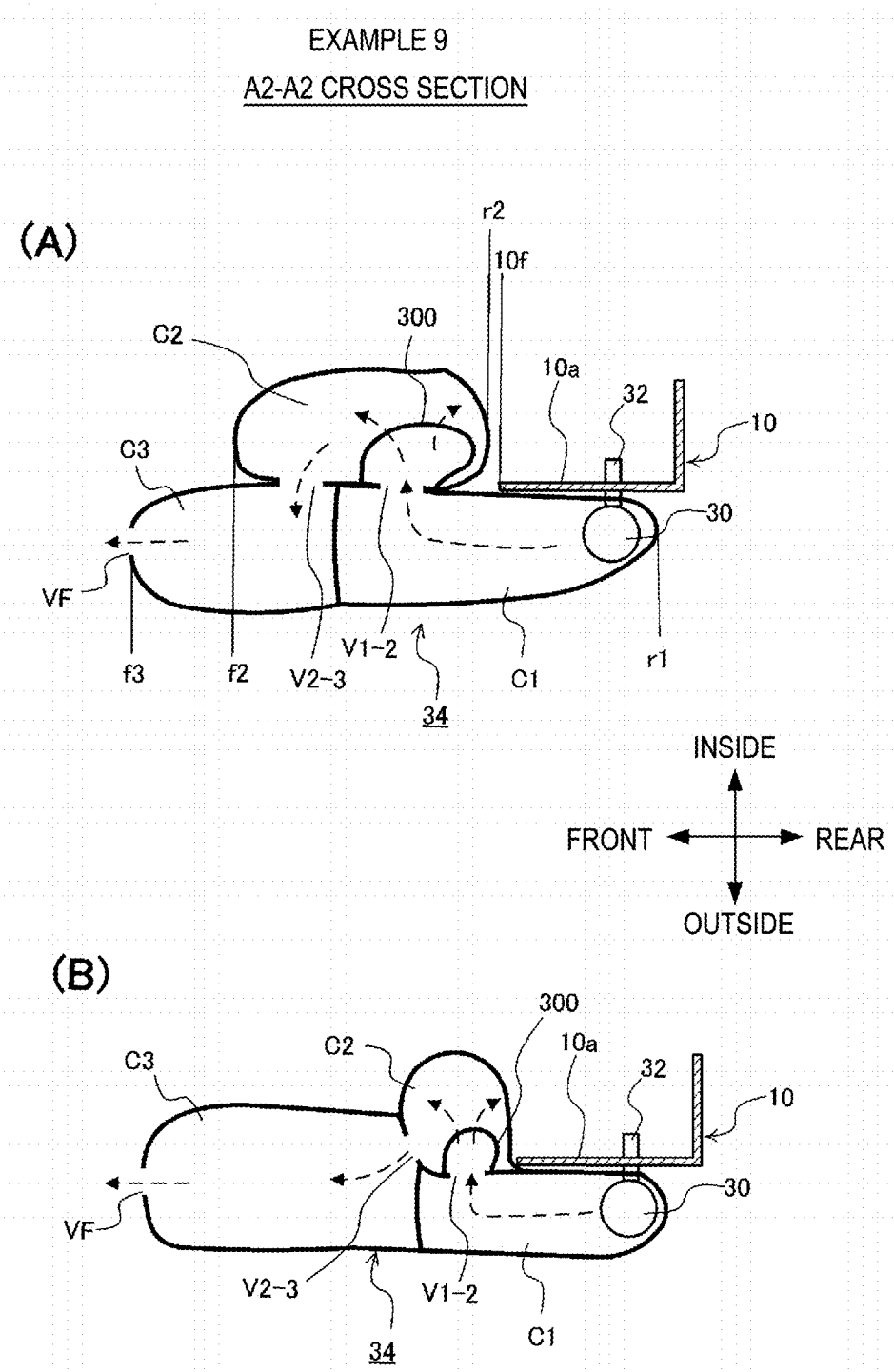

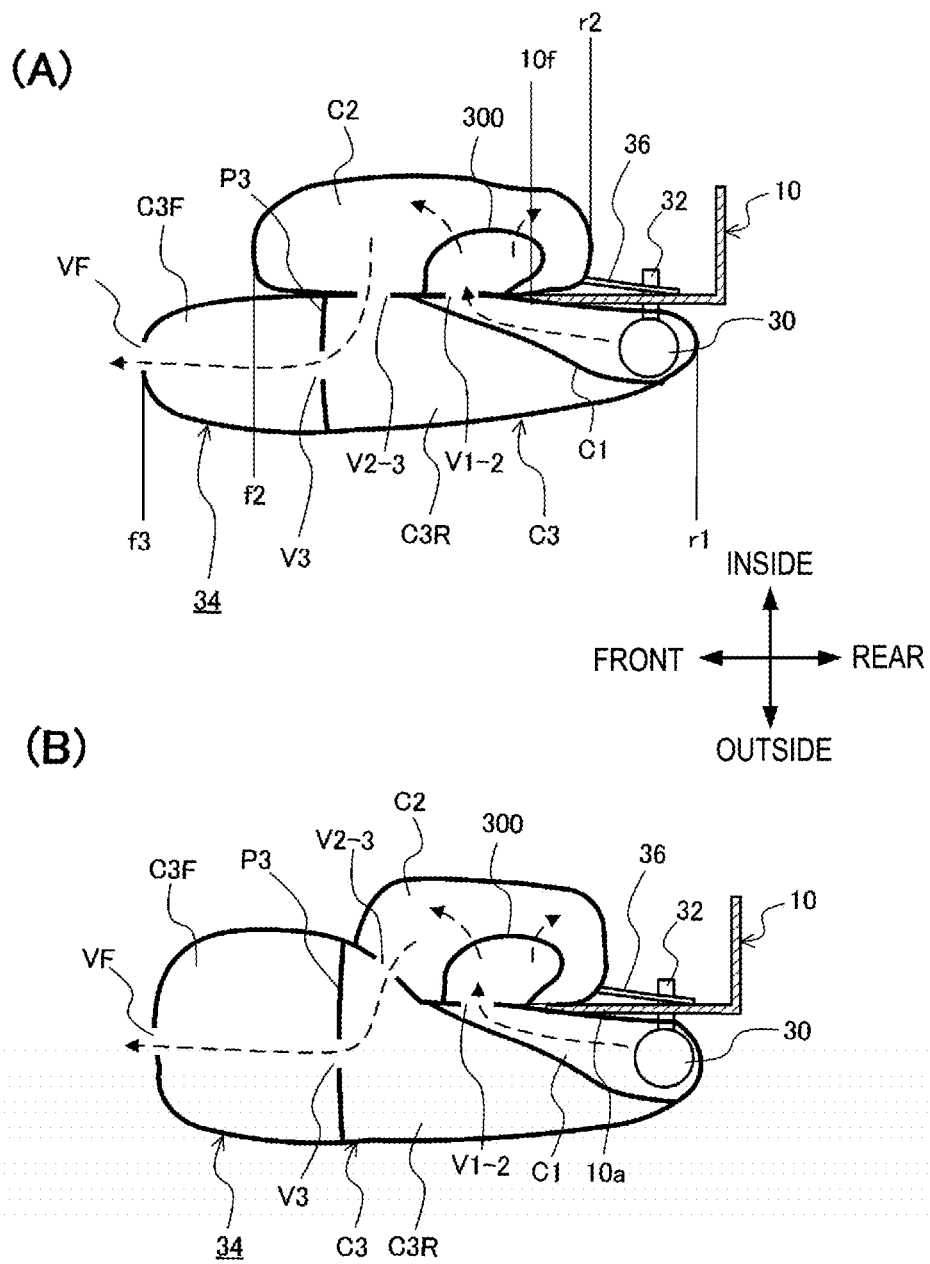

[FIG. 20]
EXAMPLE 11
A2-A2 CROSS SECTION
(A)
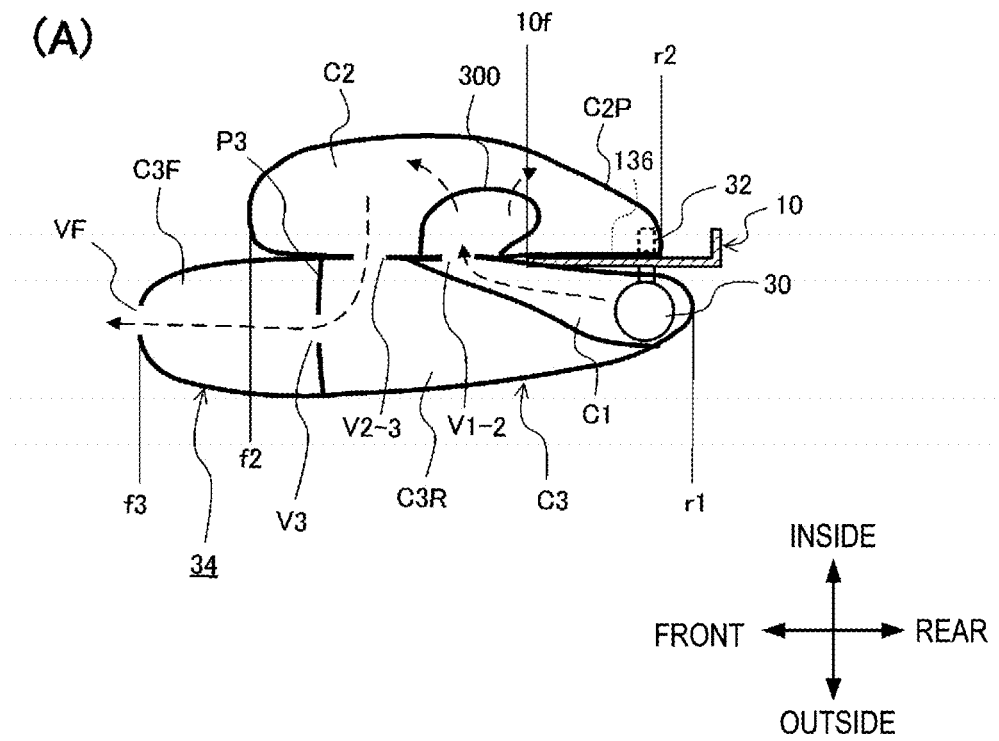
(B)
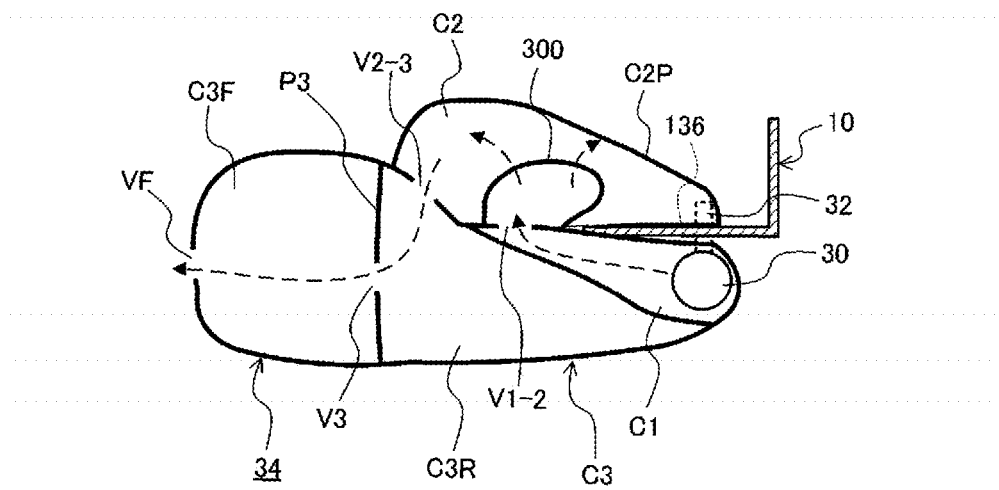

[FIG. 21]
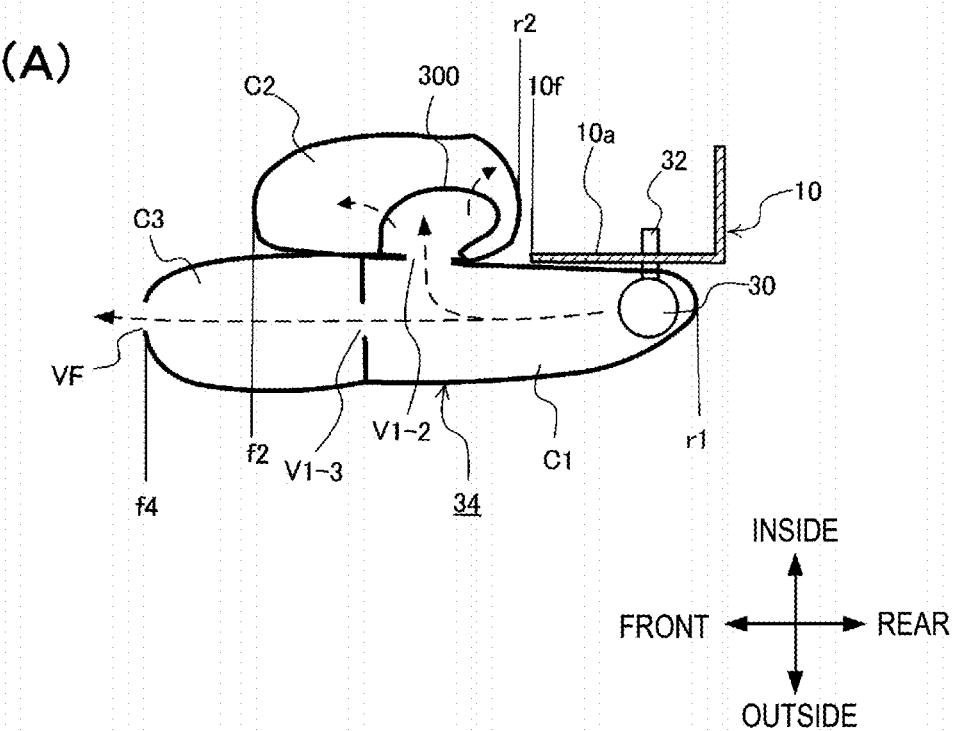
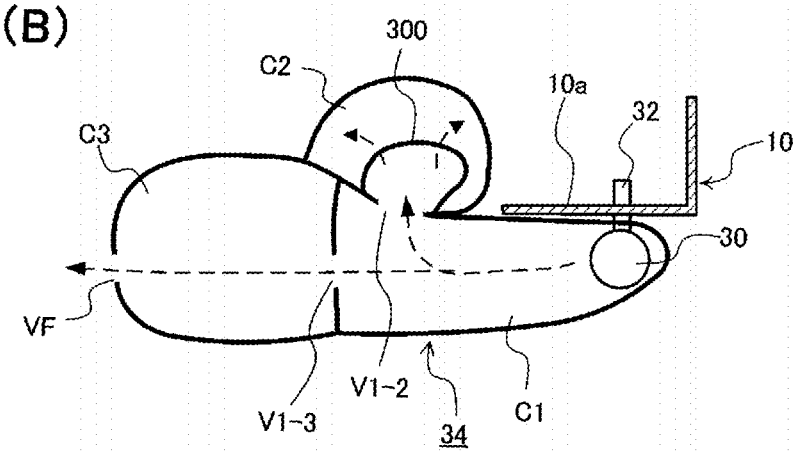

[FIG. 22]
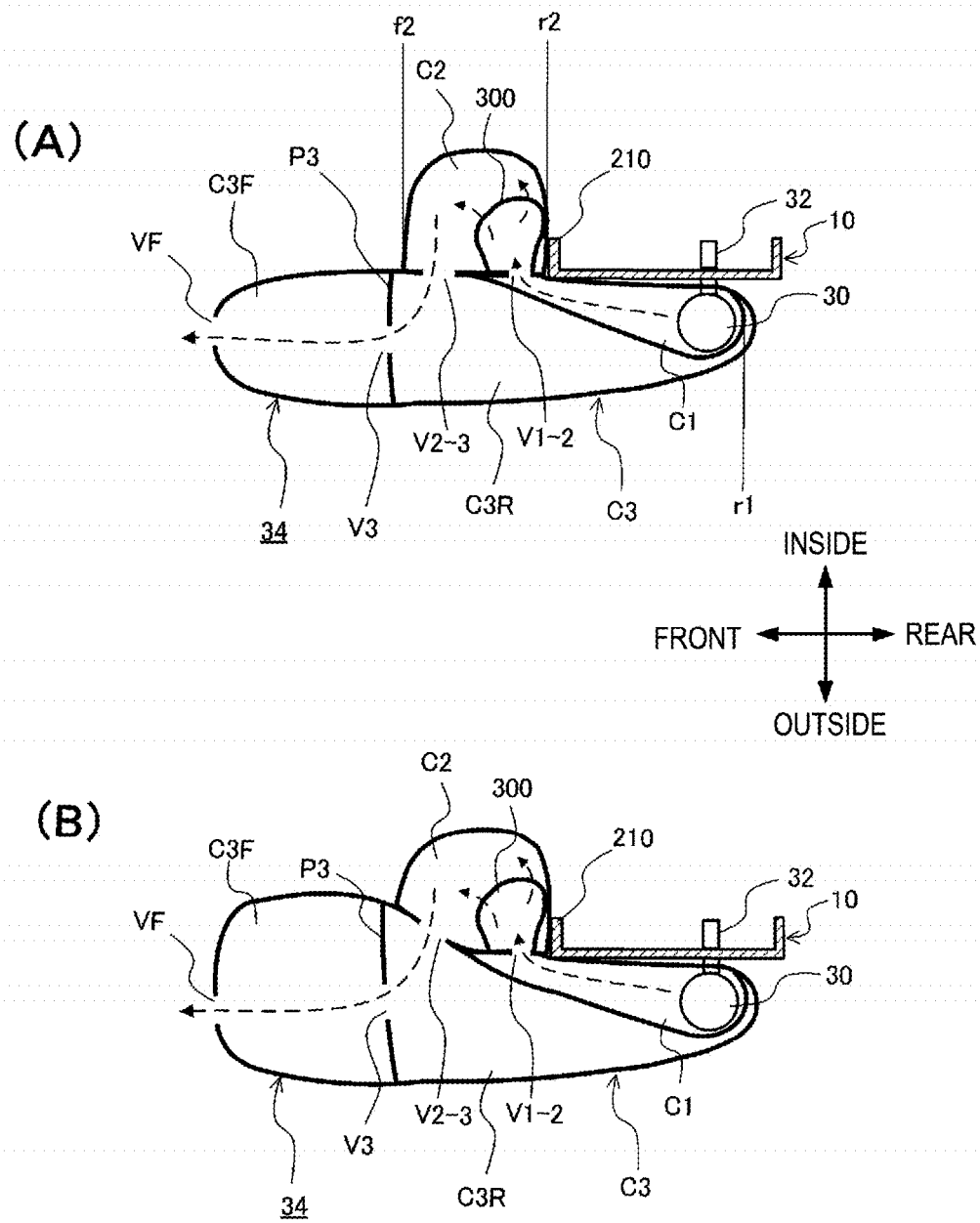

PASSENGER PROTECTION APPARATUS

TECHNICAL FIELD

The present invention relates to a passenger protection apparatus including a side airbag apparatus which protects passengers when deployed on the seat side of a vehicle.

BACKGROUND

In order to protect passengers in the event of a vehicle accident, it is well known that vehicles are equipped with one or more airbags. These airbags include, for example, various forms such as: a so-called driver airbag which is expanded from the vicinity of the steering wheel of an automobile so as protect the driver; a curtain airbag which is deployed downward on the inner side of the window of an automobile so as to protect passengers during collisions in the transverse direction of a vehicle, as well as when overturning and during rollover accidents; and a side airbag apparatus which is deployed on the side (seat side) of passengers so as to protect the passenger upon impact in the transverse direction of a vehicle. The present invention relates to a side airbag apparatus housed in a vehicle seat.

The side airbag apparatus described in the below mentioned Patent Document 1 includes a main airbag along with an auxiliary airbag. In addition, prior to the main airbag, the auxiliary airbag is configured to be expanded and deployed in order to restrain passengers at an early stage. In the first place, because a side airbag apparatus significantly restricts the installation region inside the seat, the side airbag apparatus described in Patent Document 1 equipped with a main airbag and an auxiliary airbag has to be further compacted.

Simultaneously therewith, there is a demand for appropriate passenger protection performance due to improved deployment speed and stabilization of the deployed shape and deploying behavior.

Moreover, another problem is that for the case in which a passenger is not seated normally (so-called OOP (out of position) case), the impact acting on a passenger needs be moderated.

RELATED ART DOCUMENTS

Patent Documents

[Patent Document 1] JP 2009-023494 A

SUMMARY OF THE INVENTION

Problem to be Solved by the Invention

The present invention has been created in view of the abovementioned problem, with an object of providing a passenger protection apparatus which includes a side airbag apparatus capable of quickly and properly restraining a passenger.

Moreover, another object is to provide a passenger protection apparatus including a side airbag apparatus which contributes to the size reduction of an apparatus.

A further object is to provide a passenger protection apparatus which can moderate the impact acting on the passenger in a so-called OOP (out of position) case.

Means for Solving the Problem

In order to achieve the abovementioned objects, the present invention is applied to a passenger protection apparatus, including: a vehicle seat having a seat cushion forming a seating face along with a seat back forming a backrest; and a side airbag apparatus housed in this seat.

Here, the seat back includes a side support part which swells in the vehicle traveling direction (vehicle front) on the vehicle width direction side (end).

A side frame part having a frame side wall part (which extends in the vehicle traveling direction when the horizontal cross section is seen from above) is arranged inside the side support part.

The side airbag apparatus includes: an airbag which restrains a passenger when expanded and deployed; and an inflator supplying expansion gas to the airbag.

The airbag includes: a first chamber which houses the inflator and is deployed outside in the vehicle width direction of the frame side wall part; a second chamber which is deployed inside in the vehicle width direction of the frame side wall part with respect to this first chamber; and an internal expanding part which is arranged in the second chamber and expands at least on the rear side of the vehicle via the gas flowing out from the first chamber.

In addition, the first chamber is deployed such that at least a portion thereof, as seen from the vehicle side, overlaps the frame side wall part, while the second chamber is configured to be expandable via the gas flowing out from the internal expanding part.

Note that the inside in the vehicle width direction of the frame side wall part denotes the center side (passenger side) of the seat, while the outside in the vehicle width direction of the frame side wall part denotes the outside (door side, center console side) in the transverse direction of the seat.

According to the present invention having the abovementioned configuration, the first chamber C1 is deployed outside the side support part in the initial stage of operating the airbag apparatus. At this time, because the first chamber is deployed so as to overlap the frame side wall part, as seen from the vehicle side, the first chamber is assuredly deployed such that the frame side wall part receives the reaction force of the first chamber. Subsequently, the second chamber is deployed so as to quickly restrain a passenger from moving to the outside in the vehicle width direction. At this time, the surface on the frame side of the second chamber is supported by both this frame side wall part and the first chamber (which has already begun to be deployed) or only by the first chamber, with both the frame side wall part and the first chamber, or just the first chamber, receiving the reaction force when the second chamber is deployed. Therefore, when the passenger enters the second chamber, the pressure from the passenger can be received by the frame side wall part, making it possible to assuredly restrain the passenger in the seat center direction.

The present invention further includes an internal expanding part which expands at least on the rear side of the vehicle in the second chamber, wherein the second chamber is configured to be expandable via the gas flowing in from the internal expanding part, such that the internal expanding part begins to expand prior to the deployment of the second chamber. For the case in which the passenger is seated normally, each chamber is deployed in the order of the first chamber, the internal expanding part, and the second chamber, enabling the second chamber to restrain the passenger towards the center side of the seat.

On the other hand, in the so-called OOP (out of position) case in which a child is seated closely against the side support part or stands up, even if the internal expanding part expands in the initial stage of deploying the airbag, the second chamber is pressed against by the passenger (child), making it difficult for the second chamber to expand. As a result, in the so-called OOP (out of position) case, the impact acting on the passenger due to the second chamber can be moderated. That is, a pre-push chamber (second chamber) can avoid the passenger in the OOP case from being pushed away towards the center side of the vehicle, in addition to minimizing damage to this passenger due to the second chamber.

At least one first internal vent hole is preferably formed at the boundary part between the first chamber and the second chamber such that the gas inside the first chamber flows into the second chamber. The presence of the first internal vent hole allows the expansion gas to be quickly filled throughout the airbag.

Moreover, the internal expanding part is preferably provided so as to cover the first vent. Such a configuration allows the gas from the first chamber to be directly supplied to the internal expanding part, with this internal expanding part quickly expanding.

The internal expanding part can be formed from a cloth member and sewn on the periphery of the first vent. Moreover, the internal expanding part can be continuously provided from the first chamber to the second chamber. Here, "continuously provided" includes integrally molding the internal expanding part with the first chamber, in addition to extending the internal expanding part inside the second chamber in a form similar to the extension of the first chamber. Moreover, this also includes an embodiment in which the internal expanding part is molded as a member separate from the first chamber, and the edge of the internal expanding part in communication with the first chamber is connected to the outer periphery of an opening part of the first chamber by being sewn thereon, etc., such that coupled openings are substantially congruent.

The internal expanding part can be an inner bag molded in a bag shape. In this case, a second vent for discharging the gas into the second chamber is formed in this inner bag.

The internal expanding part can be a cylindrically molded inner tube or loop diffuser. In this case, it is configured such that the upper and lower ends of this inner tube or loop diffuser open inside the second chamber.

The passenger protection apparatus can further include a third chamber disposed in front of the first chamber and coupled to the side face of the second chamber. By employing such a configuration, compared with the case in which a wide range is protected with a single chamber, the deploying behavior of the airbag is more likely to be perceived, enabling the deployed shape and deployed position of the airbag to be accurately controlled.

Moreover, the front end part of the third chamber can be configured so as to be disposed in front of the front end parts of the first chamber and the second chamber.

In this case, when seen as the deployed shape of the overall airbag, the width in the anteroposterior direction can be relatively easily increased.

Further, the third chamber can be sectioned into a front chamber part and a rear chamber part, wherein at least one fourth internal vent hole can be provided in this section part. As a result, the width in the anteroposterior direction can be further increased.

(Embodiments of the Present Invention)

The side airbag apparatus according to the present invention includes a type which is deployed on the door side of (outside) the seat, along with a type which is deployed on the vehicle center side of the seat. Note that a side airbag apparatus of a type which is deployed on the vehicle center side of the seat, for example, is referred to as a far side airbag apparatus, front center airbag, rear center airbag, etc.

BRIEF DESCRIPTION OF THE DRAWINGS

FIG. 1 is a perspective view mainly illustrating the external shape of a vehicle seat used for a passenger protection apparatus according to the present invention, with an illustration of the airbag unit omitted.

FIG. 2 is a perspective view illustrating the internal structure (seat frame) functioning as the framework of the vehicle seat illustrated in FIG. 1, with an illustration of the airbag unit omitted.

FIG. 3 is a schematic side view of the passenger protection apparatus according to the present invention and illustrates the state in which the airbag unit housed therein is observed from the outside in the vehicle width direction.

FIG. 4 is a cross sectional view illustrating the structure of the passenger protection apparatus according to the present invention, corresponding to part of the cross section in the A1-A1 direction of FIG. 3.

FIG. 5 is a schematic side view of the passenger protection apparatus according to the present invention and illustrates the state in which the airbag deployed therein is observed from the outside in the vehicle width direction.

FIG. 6 is a schematic view illustrating the deployed state of an airbag apparatus for the case in which a passenger is seated normally according to Example 1 of the present invention, corresponding to the cross section in the A2-A2 direction of FIG. 5.

FIG. 7 is a side view illustrating the deployed state of the airbag apparatus illustrated in FIG. 6, in addition to illustrating the configuration and shape of panels constituting the airbag.

FIG. 8 is a schematic view illustrating the deployed state of an airbag apparatus for the case in which a passenger is OOP (out of position) according to Example 1 of the present invention.

FIG. 9 is a schematic view illustrating the deployed state of an airbag apparatus for the case in which a passenger is seated normally according to Example 2 of the present invention, corresponding to the cross section in the A2-A2 direction of FIG. 5.

FIG. 10 is a side view illustrating the deployed state of the airbag apparatus illustrated in FIG. 9, in addition to illustrating the configuration and shape of panels constituting the airbag.

FIG. 11 is a schematic view illustrating the deployed state of an airbag apparatus for the case in which a passenger is seated normally according to Example 3 of the present invention, corresponding to the cross section in the A2-A2 direction of FIG. 5.

FIG. 12 is a side view illustrating the deployed state of the airbag apparatus illustrated in FIG. 11, in addition to illustrating the configuration and shape of panels constituting the airbag.

FIG. 13 is a schematic view illustrating the deployed state of an airbag apparatus for the case in which a passenger is seated normally according to Example 4 of the present invention, corresponding to the cross section in the A2-A2 direction of FIG. 5.

FIG. 14 is a schematic view illustrating the deployed state of an airbag apparatus for the case in which a passenger is seated normally according to Example 5 of the present invention, corresponding to the cross section in the A2-A2 direction of FIG. 5.

FIG. 15 is a schematic view illustrating the deployed state of an airbag apparatus for the case in which a passenger is seated normally according to Example 6 of the present invention, corresponding to the cross section in the A2-A2 direction of FIG. 5.

FIG. 16 is a schematic view illustrating the deployed state of an airbag apparatus for the case in which a passenger is seated normally according to Example 7 of the present invention, corresponding to the cross section in the A2-A2 direction of FIG. 5.

FIG. 17 is a schematic view illustrating the deployed state of an airbag apparatus for the case in which a passenger is seated normally according to Example 8 of the present invention, corresponding to the cross section in the A2-A2 direction of FIG. 5.

FIGS. 18(A), (B) are schematic views illustrating the deployed state of an airbag apparatus for the case in which a passenger is seated normally according to Example 9 of the present invention, corresponding to the cross section in the A2-A2 direction of FIG. 5.

FIGS. 19(A), (B) are schematic views illustrating the deployed state of an airbag apparatus for the case in which a passenger is seated normally according to Example 10 of the present invention, corresponding to the cross section in the A2-A2 direction of FIG. 5.

FIGS. 20(A), (B) are schematic views illustrating the deployed state of an airbag apparatus for the case in which a passenger is seated normally according to Example 11 of the present invention, corresponding to the cross section in the A2-A2 direction of FIG. 5.

FIGS. 21(A), (B) are schematic views illustrating the deployed state of an airbag apparatus for the case in which a passenger is seated normally according to Example 12 of the present invention, corresponding to the cross section in the A2-A2 direction of FIG. 5.

FIGS. 22(A), (B) are schematic views illustrating the deployed state of an airbag apparatus for the case in which a passenger is seated normally according to Example 13 of the present invention, corresponding to the cross section in the A2-A2 direction of FIG. 5.

DESCRIPTION OF THE PREFERRED EMBODIMENT

The vehicle seat with the side airbag apparatus according to the embodiments of the present invention mounted thereon will be described with reference to the accompanying drawings. Note that "front" displayed in each figure denotes the front (traveling direction) of a vehicle, "rear" denotes the rear (on the side opposite the traveling direction) of the vehicle, "inside" denotes the inside in the vehicle width direction (on the passenger side), and "outside" denotes the outside in the vehicle width direction (on the door panel side).

FIG. 1 is a perspective view mainly illustrating the external shape of a vehicle seat used for a passenger protection apparatus according to Example 1 of the present invention, with an illustration of the airbag apparatus (20) omitted. FIG. 2 is a perspective view illustrating the internal structure (seat frame) functioning as the framework of the vehicle seat illustrated in FIG. 1, with an illustration of the airbag apparatus (20) also omitted here. FIG. 3 is a schematic side view of the passenger protection apparatus according to Example 1, in addition to illustrating the state in which the airbag apparatus 20 housed therein on the side face (near side) near the door of the vehicle seat is observed from the outside in the vehicle width direction.

The present invention is a passenger protection apparatus including: a vehicle seat; and a side airbag apparatus (20) housed in this seat. As illustrated in FIGS. 1 and 2, seen as the location, the vehicle seat according to the present example is configured by: a seat cushion 2 of the part on which a passenger is seated; a seat back 1 forming a backrest; and a headrest 3 coupled to the upper end of the seat back 1.

A seat back frame 1f forming the skeleton of the seat is provided inside the seat back 1, while a pad made of a urethane foaming material, etc. is provided on the surface and periphery thereof, and the surface of this pad is covered with a skin 14 such as leather or fabric. A seating frame 2f is arranged on the bottom side of the seat cushion 2, while a pad made of a urethane foaming material, etc. is provided on the upper surface and periphery thereof, and the surface of this pad is covered with a skin 14 (FIG. 4) such as leather or fabric. The seating frame 2f and the seat back frame 1f are coupled via a reclining mechanism 4.

As illustrated in FIG. 2, the seat back frame 1f is configured in a frame shape by: a side frame 10 arranged so as to be separated into the left and right and extending in the vertical direction; an upper frame coupled to the upper end of this side frame 10; and a lower frame coupled to the lower end thereof. A cushion member is provided outside a headrest frame to configure the headrest 3.

FIG. 4 is a cross sectional view illustrating the structure of the passenger protection apparatus according to the present invention, corresponding to part of the cross section in the A1-A1 direction of FIG. 3. FIG. 5 is a schematic side view of the passenger protection apparatus according to the present invention and illustrates the state in which the airbag deployed therein is observed from the outside in the vehicle width direction.

The side frame 10 can be molded of resin or metal and, as illustrated in FIG. 4, can be formed into an L shaped cross sectional shape or a U shaped cross sectional shape. The side frame 10 includes a frame side wall part 10a extending in the vehicle traveling direction when the horizontal cross section is seen from above. In addition, an airbag module (side airbag apparatus) 20 is fixed to the outside in the vehicle width direction of this frame side wall part 10a.

As illustrated in FIG. 4, the seat back 1 includes a side support part 12 which swells in the vehicle traveling direction (vehicle front) on the vehicle width direction side (end). A urethane pad 16 is arranged inside the side support part 12, while the side airbag apparatus 20 is housed in a gap of the urethane pad 16. The side airbag apparatus 20 includes: an airbag 34 for restraining a passenger when expanded and deployed; and an inflator 30 for supplying expansion gas to the airbag 34.

Seams 18, 22, 24 of the skin 14 of the seat back 1 are interwoven and coupled by sewing. Note that the front seam 18 is cleft when the airbag is deployed.

Moreover, a start region 26 as a starting point (when the side support part 12 bends towards the passenger side due to the expansion of a second chamber (C2)) is formed in the side support part 12. The start region 26 can be any one of a notch, recess, or thin region, or combinations thereof. The start region 26 only needs to be formed at a urethane 16 part inside the side support part 12, and the start region 26 may also be omitted.

The airbag 34 is covered with a flexible cover 20a made of fabric. The airbag 34, for example, can appropriately employ folding or rolling in bellows (hereinafter, "folding" includes rolling), in addition to an appropriate compression method. In FIG. 4, the symbol 25 denotes a door trim. As will be described later in detail, in the storage state in which the airbag 34 is folded, as in the positional relationship when the airbag is expanded and deployed, the first chamber (C1) side on which the inflator 30 is housed is disposed outside in the vehicle width direction of the frame side wall part 10a, while the second chamber (C2) coupled to this first chamber (C1) is arranged inside in the vehicle width direction of the frame side wall part 10a.

As illustrated in FIG. 5, the airbag 34 includes: the first chamber C1 which surrounds the inflator (30) inside the side support part 12; and the second chamber C2 which is deployed inside in the vehicle width direction of the first chamber C1.

The second chamber C2 is deformed such that at least the front side part 14 of the side support part 12 protrudes towards the passenger. This second chamber C2 is deployed so as to contact and press the side support part 12 with the waist part of the passenger. When the second chamber arranged in the immediate vicinity of the passenger is deployed, the restraint performance on a passenger in the initial stage in the event of an accident can be improved. The capacity of the second chamber C2 is set so as to be larger than the capacity of the first chamber C1.

Note that the shape and capacity of the second chamber C2 may be adjusted such that the second chamber C2 may only be deployed inside the side support part 12. In other words, the deployed second chamber C2 does not have to protrude to the vehicle front compared with the front end of the cleft side support part 12. Moreover, the deploying behavior of the first chamber C1 and the second chamber C2 can be adjusted by a method of folding the airbag, the configuration of the folded airbag 34, the setting of the gas jet direction of the inflator 30, the direction of the gas flow between the first chamber C1 and the second chamber C2, etc.

[Reference Numerals]

While examples according to the present invention will hereinafter be described, reference symbols are provided based on a predetermined rule in the accompanying drawings for convenience and will be initially described regarding this point.

While chambers constituting the airbag are defined as C1 to C4 substantially along the flow of the expansion gas, a portion thereof does not necessarily coincide with the flow of the gas. Moreover, if one chamber is divided into the front and rear, the front chamber part is labeled "F," while the rear chamber part is labeled "R." For example, if the second chamber C2 is divided into the two parts of the front and rear, the front chamber part is defined as "C2F," while the rear chamber part is defined as "C2R."

An internal vent hole provided between each chamber is represented using the numbers of the chambers coupled thereto, wherein, for example, an internal vent between the first chamber and the second chamber is "V1-2." Others also follow the same rule. A vent hole for discharging gas to the outside is collectively referred to by the symbol "VF" for convenience irrespective of the location within which the vent hole is provided.

Regarding the position of the end of chambers in the anteroposterior direction along the vehicle traveling direction, the front end thereof is labeled "f," while the rear end thereof is labeled "r." In addition, after f, r, the number (2) corresponding to the number (C2, etc.) of the chamber is assigned.

Note that in each example, while identical components are labeled with identical symbols, not identical but similar components may be labeled with identical symbols.

Example 1

FIG. 6 is a schematic view illustrating the deployed state of an airbag apparatus for the case in which a passenger is seated normally according to Example 1 of the present invention, corresponding to the cross section in the A2-A2 direction of FIG. 5. FIG. 7 is a side view illustrating the deployed state of the airbag apparatus illustrated in FIG. 6, in addition to illustrating the configuration and shape of panels constituting the airbag. Moreover, FIG. 8 is a schematic view illustrating the deployed state of an airbag apparatus for the case in which a passenger is OOP (out of position) according to Example 1 of the present invention.

The side airbag apparatus (20) according to the present example includes: an airbag 34 for restraining a passenger when expanded and deployed; and an inflator 30 for supplying expansion gas to the airbag 34, The airbag 34 includes: a first chamber C1 which houses the inflator 30 and is deployed outside in the vehicle width direction of a frame side wall part 10a; a second chamber C2 which is deployed inside in the vehicle width direction of the frame side wall part 10a with respect to this first chamber C1; and an inner tube 300 which is arranged in the second chamber C2 and expands at least on the rear side of the vehicle in the second chamber C2 via the gas flowing out from the first chamber C1.

The first chamber C1 is deployed such that at least a portion thereof, as seen from the vehicle side, overlaps the frame side wall part 10a. Moreover, the second chamber C2 expands via the gas flowing out from the inner tube 300 as an internal expanding part.

As illustrated in FIG. 6, in the present example, the inflator 30 is housed inside the first chamber C1. As the inflator 30, for example, a cylindrical cylinder type inflator can be used. A pair of upper and lower stud bolts 32 protrude from the outer peripheral part of the inflator 30 towards the inside in the vehicle width direction. These stud bolts 32 are attached (fastened and fixed) to the side frame 10 by nuts. Moreover, multiple gas jet ports arranged in the peripheral direction are formed in the inflator 30, from which the gas is radially ejected. Note that a diffuser for controlling the flow of the gas can be provided as required.

An airbag control ECU (not illustrated) mounted on the vehicle is electrically connected to this inflator 30. Moreover, a satellite sensor for detecting side collisions is electrically connected to this airbag control ECU. In addition, the inflator 30 can be configured to operate when the airbag control ECU detects a side collision based on a signal from this satellite sensor.

In front of the frame side wall part 10a and the first chamber C1, the airbag 34 further includes a third chamber C3 coupled to the side parts of the first chamber C1 and the second chamber C2. The presence of the third chamber C3 allows the capacity of the first chamber C1 to be relatively small, while the gas emitted from the inflator 30 is more likely to be introduced in the desired direction, resulting in improved rectification effects of the gas.

The third chamber C3 is sectioned into a front chamber part C3F and a rear chamber part C3R, with the internal vent hole V3 provided at this section part. Moreover, the vent hole V1-2 is formed at the boundary part between the first chamber C1 and the second chamber C2, while the vent hole V2-3 is formed at the boundary part between the second chamber C2 and the rear chamber part C3R of the third chamber C3.

The inner tube 300 is configured to be cylindrically molded so as to extend in the direction perpendicular to the paper face of FIG. 6 (vertical direction of the vehicle), with the upper and lower ends opening inside the second chamber C2. Such an inner tube 300 can be molded from the same cloth member as in other chambers, and as illustrated in FIG. 7, can be sewn on the periphery of the vent hole V1-2.

As indicated by the dashed line arrows, expansion gas emitted from the inflator 30 flows from the first chamber C1 to the inner tube 300 via the vent hole V1-2, and is subsequently filled into the second chamber C2 from upper and lower openings of the inner tube 300. In addition, the gas inside the second chamber C2 flows in a rear chamber part C3R of the third chamber C3 via the vent hole V2-3, and is then discharged from an external vent hole VF (formed at the front end of a front chamber part C3F of the third chamber C3) via the vent hole V3.

As illustrated in FIG. 7(B), a protruding expanding part C2P (C2PU, C2PL) is formed in the rear of the second chamber C2. This protruding expanding part C2P (C2PU, C2PL) consists of a part C2PU disposed above two holes 32U, 32L for the stud bolts 32, along with a part C2PL disposed therebelow. In addition, in order to avoid the position of each hole 32U, 32L for the stud bolt 32, that is, the attachment position of the inflator 30, protruding expanding parts C2PU, C2PL are formed. A non-expanding region 136 is disposed between these two protruding expanding parts C2PU, C2PL, with this non-expanding region 136 fastened and fixed to the stud bolts 32.

Normally, the rear part of the second chamber C2 overlaps the space for attaching the inflator, necessitating that the rear end of the second chamber C2 be arranged in front of the inflator 30. However, by forming the abovementioned protruding expanding part C2P (C2PU, C2PL), the second chamber C2 can be extended more rearward than the inflator 30 (stud bolt 32). As a result, the second chamber C2 can be sufficiently overlapped with the side frame 10, while the reaction force from the side frame 10 can be utilized when the air bag is expanded and deployed, enabling deployment with a stable behavior and position.

The operation (mode of operation) in the present example will hereinafter be described. First, for the case in which a passenger is seated normally in the seat, as illustrated in FIG. 6, each chamber is deployed in the order of the first chamber C1, the inner tube 300, the second chamber C2, and the third chamber C3. That is, all chambers are fully deployed. In the initial stage of deploying the airbag 34, the gas supplied via the inner tube 300 allows the second chamber to be expanded and deployed so as to restrain the passenger towards the center side of the seat.

On the other hand, in the so-called OOP (out of position) case in which a child is seated pressed up against a side support part or stands up, as illustrated in FIG. 8, even if the second chamber C2 is pressed against by the passenger (child) in the initial stage of deploying the airbag 34 so as to deploy the inner tube 300, the second chamber C2 tends not to expand, while the gas tends to flow into the third chamber C3. As a result, the impact acting on the passenger due to the expansion of the second chamber C2 can be moderated. That is, a pre-push chamber (second chamber C2) can prevent the passenger in the OOP case from being pushed away towards the center side of the vehicle, in addition to minimizing damage to this passenger due to the second chamber C2. At this time, because the third chamber C3 is quickly deployed, this third chamber C3 assuredly restrains and protects the lateral movement of the passenger.

Moreover, according to the present example having the abovementioned configuration, the first chamber C1 is deployed outside the side support part in the initial stage of operating the airbag apparatus. At this time, because the first chamber C1 is deployed so as to overlap the frame side wall part 10*a*, as seen from the vehicle side, the first chamber C1 is assuredly deployed such that the frame side wall part 10*a* receives the reaction force of the first chamber C1. Subsequently, the second chamber C2 is deployed so as to quickly restrain a passenger P from moving to the outside in the vehicle width direction. At this time, the surface on the frame side of the second chamber C2 is supported by both this frame side wall part and the first chamber (which has already begun to be deployed), with both the frame side wall part 10*a* and the first chamber C1 receiving the reaction force when the second chamber is deployed. Therefore, when the passenger P enters the second chamber C2, the pressure from the passenger P can be received by the frame side wall part 10*a*, making it possible to assuredly restrain the passenger P in the seat center direction.

Example 2

FIG. 9 is a schematic view illustrating the deployed state of an airbag apparatus for the case in which a passenger is seated normally according to Example 2 of the present invention, corresponding to the cross section in the A2-A2 direction of FIG. 5. FIG. 10 is a side view illustrating the deployed state of the airbag apparatus illustrated in FIG. 9, in addition to illustrating the configuration and shape of panels constituting the airbag.

Example 2 employs the same structure and exerts the same operations and effects as Example 1 described above in the majority parts thereof, with only differences therebetween described.

Example 2 employs a loop diffuser 310 as an internal expanding part. The loop diffuser 310 is configured to be cylindrically molded so as to extend in the direction perpendicular to the paper face of FIG. 9 (vertical direction of the vehicle), with the upper and lower ends opening inside the second chamber C2. Such a loop diffuser 310 is molded from the same cloth member as in other chambers, in addition to functioning to diffuse expansion gas in a range wider than the inner tube 300.

As indicated by the dashed line arrows, expansion gas emitted from the inflator 30 flows from the first chamber C1 to the loop diffuser 310 via the vent hole V1-2, and is subsequently filled into the second chamber C2 from the upper and lower openings of the loop diffuser 310. In addition, the gas inside the second chamber C2 flows in a rear chamber part C3R of the third chamber C3 via the vent hole V2-3, and is then discharged from an external vent hole VF (formed at the front end of a front chamber part C3F of the third chamber C3) via the vent hole V3.

Example 3

FIG. 11 is a schematic view illustrating the deployed state of an airbag apparatus for the case in which a passenger is seated normally according to Example 3 of the present invention, corresponding to the cross section in the A2-A2 direction of FIG. 5. FIG. 12 is a side view illustrating the deployed state of the airbag apparatus illustrated in FIG. 11, in addition to illustrating the configuration and shape of panels constituting the airbag.

Example 3 employs the same structure and exerts the same operations and effects as the abovementioned Example 1 in the majority parts thereof, with only differences therebetween described.

Example 3 employs an inner bag 320 as an internal expanding part. The inner bag 320 is molded in a bag shape so as to extend in the direction perpendicular to the paper face of FIG. 11 (vertical direction of the vehicle), and a vent hole Vx-2 in fluid communication with the second chamber C2 is formed. Such an inner bag 320 can be formed from the same cloth member as in other chambers. The vent hole Vx-2 is provided so as to be disposed in the vicinity of the vent hole V2-3 which is provided at the boundary part between the second chamber C2 and the third chamber C3. As a result, the gas discharged from the inner bag 320 will quickly and smoothly flow into the third chamber C3.

As indicated by the dashed line arrows, expansion gas emitted from the inflator 30 flows from the first chamber C1 to the inner bag 320 via the vent hole V1-2, and is subsequently filled into the second chamber C2 from the vent hole Vx-2 of the inner bag 320. In addition, the gas inside the second chamber C2 flows in a rear chamber part C3R of the third chamber C3 via the vent hole V2-3, and is then discharged from an external vent hole VF (formed at the front end of a front chamber part C3F of the third chamber C3) via the vent hole V3.

(Other Forms of the Internal Expanding Part)

In Examples 1 to 3 described above, the inner tube 300, the loop diffuser 310, and the inner bag 320, which are employed as internal expanding parts, are configured to be completely independent members separate from the first chamber C1, with these members (300, 310, 320) capable of being continuously provided from the first chamber C1 to the second chamber C2. Here, "continuously provided" includes integrally molding the internal expanding parts with the first chamber C1, in addition to extending the internal expanding parts inside the second chamber C2 in a form similar to the extension of the first chamber C2. Moreover, this also includes an embodiment in which the internal expanding parts are molded as members separate from the first chamber C1, the edges of the internal expanding parts in communication with the first chamber C1 are connected to the outer periphery of an opening part V1-2 of the first chamber C1 by being sewn thereon, etc., such that openings coupling the first chamber C1 to the internal expanding parts (300, 310, 320) are substantially congruent.

Other aspects (Examples 4 to 13) to which the internal expanding parts (300, 310, 320) according to the abovementioned Examples 1 to 3 can be applied will hereinafter be described with reference to FIGS. 13 to 22. Note that components identical or similar to those of the abovementioned examples are labeled with identical reference symbols, with redundant descriptions thereof omitted. Moreover, Examples 4 to 13 employ the inner tube 300 as the internal expanding part, but can also apply the loop diffuser 310 and the inner bag 320.

Example 4

FIG. 13 is a schematic view illustrating the deployed state of an airbag apparatus according to Example 4 of the present invention, corresponding to the cross section in the A2-A2 direction of FIG. 5. The side airbag apparatus 20 according to the present example includes: an airbag 34 for restraining a passenger when expanded and deployed; and an inflator 30 for supplying expansion gas to the airbag 34, The airbag 34 includes: a first chamber C1 which houses the inflator 30 and is deployed outside in the vehicle width direction of the frame side wall part 10a; and a second chamber C2 which is deployed inside in the vehicle width direction of the frame side wall part 10a. In addition, the first chamber C1 is deployed such that the rear part thereof, as seen from the vehicle side, overlaps the frame side wall part 10a. In contrast, a rear end part r2 in an expanding region of the second chamber C2 is deployed so as to be disposed in front of a rear end part r1 of the first chamber C1, as seen from the vehicle side.

As illustrated in FIG. 13, in the present example, the inflator 30 is housed inside the first chamber C1. As the inflator 30, for example, a cylindrical cylinder type inflator can be used. A pair of upper and lower stud bolts 32 protrude from the outer peripheral part of the inflator 30 towards the inside in the vehicle width direction. These stud bolts 32 are attached (fastened and fixed) to the side frame 10 by nuts. Multiple gas jet ports arranged in the peripheral direction are formed in the inflator 30, from which the gas is radially ejected. Note that a diffuser for controlling the flow of the gas can be provided as required.

Example 5

FIG. 14 is a schematic view illustrating the deployed state of an airbag apparatus according to Example 5 of the present invention, corresponding to the cross section in the A2-A2 direction of FIG. 5. The side airbag apparatus 20 according to the present example includes: an airbag 34 for restraining a passenger when expanded and deployed; and an inflator 30 for supplying expansion gas to the airbag 34, The airbag 34 includes: a first chamber C1 which houses the inflator 30 and is deployed outside in the vehicle width direction of the frame side wall part 10a; and a second chamber C2 which is deployed inside in the vehicle width direction of the frame side wall part 10a. In addition, the first chamber C1 is deployed such that the rear part thereof, as seen from the vehicle side, overlaps the frame side wall part 10a. In contrast, a rear end part r2 in an expanding region of the second chamber C2 is deployed so as to be disposed in front of a rear end part r1 of the first chamber C1, as seen from the vehicle side.

The difference between the present example and Example 4 described above is that only a strap (strip member) 36 provided at the rear end of the second chamber C2. The strap 36 couples the rear end of the second chamber C2 and the stud bolts 32. Note that the rear end of the strap 36 can be coupled to the side frame 10. In such a configuration, the deploying behavior, deployed shape, and deployed position in the anteroposterior direction of the second chamber C2 can be controlled.

Note that in the present example, along with other examples described below, other coupling structures can be employed instead of the strap 36. For example, a non-expanding region can be configured so as to be formed in the rear of the expanding region of the second chamber C2, with this non-expanding region capable of being configured so as to be coupled to the stud bolts 32 for attaching the side frame 10 or the inflator 30 to the side frame 10.

Example 6

FIG. 15 is a schematic view illustrating the deployed state of an airbag apparatus according to Example 6 of the present invention, corresponding to the cross section in the A2-A2 direction of FIG. 5. The side airbag apparatus 20 according to the present example includes: an airbag 34 for restraining a passenger when expanded and deployed; and an inflator 30 for supplying expansion gas to the airbag 34, The airbag 34 includes: a first chamber C1 which houses the inflator 30 and is deployed outside in the vehicle width direction of the frame side wall part 10*a*; and a second chamber C2 which is deployed inside in the vehicle width direction of the frame side wall part 10*a*. In addition, the first chamber C1 is deployed such that the rear part thereof, as seen from the vehicle side, overlaps the frame side wall part 10*a*. In contrast, a rear end part r2 in an expanding region of the second chamber C2 is deployed so as to be disposed in front of a rear end part r1 of the first chamber C1, as seen from the vehicle side.

The present example is a modified example of the abovementioned Example 5, with the difference being that the second chamber C2 is sectioned into the front and rear so as to form a front chamber part C2F and a rear chamber part C2R. A partition panel P2 is arranged at the boundary part between the front chamber part C2F and the rear chamber part C2R, with a vent hole V2 formed at a portion thereof.

According to the present example, in addition to the effects of the abovementioned Examples 4 and 5, when the second chamber C2 is divided into the front chamber part C2F and the rear chamber part C2R, the width in the anteroposterior direction of the second chamber C2 is easily enlarged.

Example 7

FIG. 16 is a schematic view illustrating the deployed state of an airbag apparatus according to Example 7 of the present invention, corresponding to the cross section in the A2-A2 direction of FIG. 5. The side airbag apparatus 20 according to the present example includes: an airbag 34 for restraining a passenger when expanded and deployed; and an inflator 30 for supplying expansion gas to the airbag 34, The airbag 34 includes: a first chamber C1 which houses the inflator 30 and is deployed outside in the vehicle width direction of the frame side wall part 10*a*; and a second chamber C2 which is deployed inside in the vehicle width direction of the frame side wall part 10*a*. In addition, the first chamber C1 is deployed such that the rear part thereof, as seen from the vehicle side, overlaps the frame side wall part 10*a*. In contrast, a rear end part r2 in the expanding region of the second chamber C2 is deployed so as to be disposed in front of a rear end part r1 of the first chamber C1, as seen from the vehicle side.

Further, in the present example, a fourth chamber C4 coupled to this first chamber C1 is included on the side of the first chamber C1 opposite (outside) the second chamber C2.

By employing such a configuration, compared with the case in which a wide range is protected with a single chamber, the deploying behavior of the airbag is more likely to be perceived, enabling the deployed shape and deployed position of the airbag to be accurately controlled.

An internal vent hole V1-4 is formed at the boundary part between the first chamber C1 and the fourth chamber C4 such that the gas inside the first chamber C1 flows into the fourth chamber C4. Therefore, the expansion gas branched from the first chamber C1 is separately fed into the second chamber C2 and the fourth chamber C4, respectively, thereby contributing to the quick deployment of the second chamber C2 and the fourth chamber C4.

Because the front end part of the fourth chamber C4 is disposed in front of the front end parts of the first chamber C1 and the second chamber C2, when seen as the deployed shape of the overall airbag, the width in the anteroposterior direction can be relatively easily increased.

Example 8

FIG. 17 is a schematic view illustrating the deployed state of an airbag apparatus according to Example 8 of the present invention, corresponding to the cross section in the A2-A2 direction of FIG. 5. The side airbag apparatus 20 according to the present example includes: an airbag 34 for restraining a passenger when expanded and deployed; and an inflator 30 for supplying expansion gas to the airbag 34, The airbag 34 includes: a first chamber C1 which houses the inflator 30 and is deployed outside in the vehicle width direction of the frame side wall part 10*a*; and a second chamber C2 which is deployed inside in the vehicle width direction of the frame side wall part 10*a*. In addition, the first chamber C1 is deployed such that the rear part thereof, as seen from the vehicle side, overlaps the frame side wall part 10*a*. In contrast, a rear end part r2 in the expanding region of the second chamber C2 is deployed so as to be disposed in front of a rear end part r1 of the first chamber C1, as seen from the vehicle side.

The present example is a modified example of the abovementioned Example 7, with most configurations identical. The difference is that a partition panel P6 sections the fourth chamber C4 into a front chamber part C4F and a rear chamber part C4R, with a vent hole V4 provided at this partition panel P6.

According to the present example, in addition to the effects of the abovementioned Example 7, when the fourth chamber C4 is divided into the front chamber part C4F and the rear chamber part C4R, the width in the anteroposterior direction of the fourth chamber C4 is easily enlarged.

Example 9

FIGS. 18(A), (B) are schematic views illustrating the deployed state of an airbag apparatus according to Example 9 of the present invention, corresponding to the cross section in the A2-A2 direction of FIG. 5. The examples illustrated in both figures (A) and (B) are configured based on the same concept, only slightly differing in terms of the configuration and structure of a third chamber C3.

The side airbag apparatus 20 according to the present example includes: an airbag 34 for restraining a passenger when expanded and deployed; and an inflator 30 for supplying expansion gas to the airbag 34, The airbag 34 includes: a first chamber C1 which houses the inflator 30 and is deployed outside in the vehicle width direction of the frame side wall part 10*a*; and a second chamber C2 which is deployed inside in the vehicle width direction of the frame side wall part 10*a*. In addition, the first chamber C1 is deployed such that the rear part thereof, as seen from the vehicle side, overlaps the frame side wall part 10*a*. In contrast, a rear end part r2 in the expanding region of the second chamber C2 is deployed so as to be disposed in front of a rear end part r1 of the first chamber C1 and hardly overlap the frame side wall part 10*a* as seen from the vehicle side.

In the present example, the third chamber C3 coupled to the front end of the first chamber C1 and the side face of the second chamber C2 is further included. An internal vent hole V2-3 is formed at the boundary part between the second chamber C2 and the third chamber C3 such that the gas inside the second chamber C2 flows into the third chamber C3. Note that the first chamber C1 and the third chamber C3 are completely separated.

In the example illustrated in figure (A), the third chamber C3 is disposed outside the side frame 10, so as to be deployed in front of the first chamber C1 and outside the second chamber C2.

On the other hand, in the example illustrated in figure (B), the third chamber C3 is deployed in front of the first chamber and in front of the side frame 10, in addition to being partially disposed in front of the second chamber C2. The structure as in figure (B) advantageously allows the flow of gas to smoothly reach the third chamber C3 from the first chamber C1 via the second chamber C2.

In the present example, the expansion gas flows in the order of the first chamber C1, the second chamber C2, and the third chamber C3, and is expanded and deployed in this order. Therefore, the passenger P is quickly restrained by the first chamber C1 and the second chamber C2 in an early stage, allowing the restraint range to be widely assured by the third chamber C3.

Example 10

FIGS. 19(A), (B) are schematic views illustrating the deployed state of an airbag apparatus according to Example 10 of the present invention, corresponding to the cross section in the A2-A2 direction of FIG. 5. The examples illustrated in both figures (A) and (B) are configured based on the same concept, only slightly differing in terms of the configuration and structure of the third chamber C3.

The side airbag apparatus 20 according to the present example includes: an airbag 34 for restraining a passenger when expanded and deployed; and an inflator 30 for supplying expansion gas to the airbag 34, The airbag 34 includes: a first chamber C1 which houses the inflator 30 and is deployed outside in the vehicle width direction of the frame side wall part 10*a*; and a second chamber C2 which is deployed inside in the vehicle width direction of the frame side wall part 10*a*. In addition, the first chamber C1 is deployed such that the rear part thereof, as seen from the vehicle side, overlaps the frame side wall part 10*a*. In contrast, the second chamber C2 is deployed such that, as seen from the vehicle side, the front part does not overlap the first chamber C1, while the rear part thereof overlaps the frame side wall part 10*a*.

The greatest characteristic of the side airbag apparatus according to the present example is the further inclusion of the third chamber C3 housing the first chamber C1 outside the frame side wall part 10*a*. That is, the third chamber C3 completely encloses the first chamber C1. The presence of the third chamber C3 allows the capacity of the first chamber C1 to be relatively small, while the gas emitted from the inflator 30 is more likely to be introduced in the desired direction, resulting in improved rectification effects of the gas.

The third chamber C3 is sectioned into a front chamber part C3F and a rear chamber part C3R, with the internal vent hole V3 provided at this section part. Moreover, the vent hole V1-2 is formed at the boundary part between the first chamber C1 and the second chamber C2, while the vent hole V2-3 is formed at the boundary part between the second chamber C2 and the rear chamber part C3R of the third chamber C3. In addition, the gas emitted from the inflator flows in the order of the first chamber C1, the second chamber C2, the rear chamber part C3R of the third chamber C3, and the front chamber part C3F of the third chamber C3.

In the example illustrated in FIG. (A), the third chamber C3 (C3F, C3R) is disposed outside the side frame 10, so as to be deployed in front of the first chamber C1 and outside the second chamber C2.

On the other hand, in the example illustrated in FIG. (B), the third chamber C3 (specifically, C3F) is deployed in front of the first chamber and in front of the side frame 10, in addition to being partially disposed in front of the second chamber C2. The structure as in FIG. (B) advantageously allows the flow of gas to smoothly reach the third chamber C3 from the first chamber C1 via the second chamber C2.

Example 11

FIGS. 20(A), (B) are schematic views illustrating the deployed state of an airbag apparatus according to Example 11 of the present invention, corresponding to the cross section in the A2-A2 direction of FIG. 5. The examples illustrated in both FIGS. (A) and (B) are configured based on the same concept, only differing in terms of the configuration and structure of a third chamber C3.

The side airbag apparatus 20 according to the present example includes: an airbag 34 for restraining a passenger when expanded and deployed; and an inflator 30 for supplying expansion gas to the airbag 34, The airbag 34 includes: a first chamber C1 which houses the inflator 30 and is deployed outside in the vehicle width direction of the frame side wall part 10*a*; and a second chamber C2 which is deployed inside in the vehicle width direction of the frame side wall part 10*a*. In addition, the first chamber C1 is deployed such that the rear part thereof, as seen from the vehicle side, overlaps the frame side wall part 10*a*. In contrast, as seen from the vehicle side, the rear end part r2 in the expanding region of the second chamber C2 is disposed slightly in front of the rear end part r1 of the first chamber C1, but extends substantially rearward towards the position of the stud bolts 32.

The present example is a modified example of the above-mentioned Example 10, with most configurations identical. The difference is that a protruding expanding part C2P is formed in the rear of the second chamber C2. Note that the protruding expanding part C2P of the second chamber C2 employed in the present example is the same as in Example 1 described above.

In the example illustrated in FIG. 20(A), the third chamber C3 (C3F, C3R) is disposed outside the side frame 10, so as to be deployed in front of the first chamber C1 and outside the second chamber C2.

On the other hand, in the example illustrated in FIG. 20(B), the third chamber C3 (specifically, C3F) is deployed in front of the first chamber and in front of the side frame 10, in addition to being partially disposed in front of the second chamber C2. The structure as in figure (B) advantageously allows the flow of gas to smoothly reach the third chamber C3 from the first chamber C1 via the second chamber C2.

Example 12

FIG. 21 is a schematic view illustrating the deployed state of an airbag apparatus according to Example 12 of the present invention, corresponding to the cross section in the A2-A2 direction of FIG. 5. The examples illustrated in both figures (A) and (B) are configured based on the same concept, only slightly differing in terms of the configuration and structure of the third chamber C3.

In the side airbag apparatus according to the present example, at least one vent hole V1-3 is formed at the boundary part between the third chamber C3 and the first chamber C1, such that the gas inside the first chamber C1 flows into the third chamber C3. Note that in the example illustrated in FIG. 18, such a configuration as a vent hole V2-3 present at the boundary part between the second chamber C2 and the third chamber C3 is not employed in the present example.

In the present example, because the expansion gas is configured to flow from the first chamber C1 to the second chamber C2 and the third chamber C3, the second chamber C2 and the third chamber C3 are substantially simultaneously expanded and deployed. Therefore, advantageously, the passenger can be substantially simultaneously protected by the third chamber (main chamber) C3 and the second chamber (pre-push chamber) C2. For example, even in a state in which the passenger P sits slightly on the tip side of a seating face of a seat and cannot be sufficiently restrained by the second chamber C2, the third chamber C3 enables the passenger to be quickly and assuredly restrained in the initial stage of the collision.

In the example illustrated in FIG. (A), the third chamber C3 is disposed outside the frame side wall part 10a of the side frame 10, so as to be deployed in front of the first chamber C1 and outside the second chamber C2. On the other hand, in the example illustrated in FIG. (B), the third chamber C3 is deployed in front of the first chamber and in front of the frame side wall part 10a of the side frame 10, in addition to being partially disposed in front of the second chamber C2.

Example 13

FIG. 22 is a schematic view illustrating the deployed state of an airbag apparatus according to Example 13 of the present invention, corresponding to the cross section in the A2-A2 direction of FIG. 5. The examples illustrated in both FIGS. (A) and (B) are configured based on the same concept, only differing in terms of the configuration and structure of a third chamber C3. Note that because the present example has a large number of parts common to Example 11 illustrated in FIG. 20, descriptions will be provided focusing on the differences from Example 11 in order to facilitate understanding.

Unlike Example 11, in the present example, when the airbag in the deployed state is observed from the vehicle width direction, the second chamber C2 is configured so as not to overlap the frame side wall part 10a of the side frame 10. A front wall part 210 which protrudes towards the inside (inside in the vehicle width direction) of the vehicle is formed at the front end of the frame side wall part 10a and supported such that the rear end part of the second chamber C2 abuts this front wall part 210.

Moreover, in addition to the third chamber C3, the first chamber C1 is provided so as to surround the inflator 30 in the so-called bag-in bag-out form.

In the example illustrated in FIG. 22(A), the third chamber C3 (C3F, C3R) is disposed outside the side frame 10 so as to be deployed in front of the first chamber C1 and outside the second chamber C2.

On the other hand, in the example illustrated in FIG. 22(B), the third chamber C3 (specifically, C3F) is deployed in front of the first chamber and in front of the side frame 10, in addition to being partially disposed in front of the second chamber C2. The structure as in FIG. (B) advantageously allows the flow of gas to smoothly reach the third chamber C3 from the first chamber C1 via the second chamber C2.

(Interpretation of the Technical Scope of the Present Invention)

While the present invention has been described with reference to the abovementioned illustrative embodiments, many equivalent changes and variations will be obvious to those skilled in the art from the present disclosure. Therefore, the abovementioned illustrative embodiments of the present invention are presumably illustrative but not limiting. Without departing from the spirit and scope of the present invention, the described embodiments may take on various modifications. For example, while a side airbag apparatus on the near side has been predominantly mentioned in the Description of the Preferred Embodiment, use is also possible with a far side airbag apparatus (surface on the far side from a vehicle door of a vehicle seat), in very small vehicles such as a single seat vehicle (irrespective of the presence of a door, a vehicle including parts with only one seat in a single row), and the like.

The invention claimed is:

1. A passenger protection apparatus, comprising:
a vehicle seat having a seat cushion forming a seating face along with a seat back forming a backrest; and a side airbag apparatus housed in the vehicle seat,
the seat back including a side support part which expands in a vehicle traveling direction on a vehicle width direction side,
a side frame part having a frame side wall part arranged inside the side support part,
the side airbag apparatus including an airbag for restraining a passenger when expanded and deployed and an inflator for supplying expansion gas to the airbag, airbag including: a first chamber which houses the inflator and is deployed outside in a vehicle width direction of the frame side wall part; a second chamber which is deployed inside in the vehicle width direction of the frame side wall part with respect to the first chamber; a third chamber which is disposed in front of the first chamber and coupled to the side face of the second chamber; and an internal expanding part which is arranged in the second chamber, and expands via gas flowing out from the first chamber,
wherein first chamber is deployed such that at least a portion thereof in a lateral direction overlaps the frame side wall part, and
wherein the second chamber is configured to be expandable via gas flowing out from the internal expanding part.

2. The passenger protection apparatus according to claim 1, wherein:
a first vent, in which gas flows from the first chamber to the second chamber, is formed at a boundary part between the first chamber and the second chamber, and
the internal expanding part is provided so as to cover the first vent.

3. The passenger protection apparatus according to claim 2, wherein the internal expanding part is formed from a cloth member and sewn on a periphery of the first vent.

4. The passenger protection apparatus according to claim 1, wherein the internal expanding part is continuously provided from the first chamber to the second chamber.

5. The passenger protection apparatus according to claim 1, wherein the third chamber is disposed in front of the side frame part.

6. The passenger protection apparatus according to claim 1, wherein the third chamber is sectioned into a front chamber part and a rear chamber part.

7. The passenger protection apparatus according to claim 1, wherein a second vent, in which the gas flows from the second chamber to the third chamber, is formed at a boundary between the second chamber and the third chamber.

8. The passenger protection apparatus according to claim 1, wherein:
the internal expanding part is an inner bag molded in a bag shape, and
an inner vent for discharging gas into the second chamber is formed in the inner bag.

9. The passenger protection apparatus according to claim 7, wherein:
the internal expanding part is an inner bag molded in a bag shape, and an inner vent for discharging gas into the second chamber is formed in the inner bag, and
the inner vent is disposed in a vicinity of the second vent.

10. A passenger protection apparatus, comprising:
a vehicle seat having a seat cushion forming a seating face along with a seat back forming a backrest; and a side airbag apparatus housed in the vehicle seat, the seat back including a side support part which expands in a vehicle traveling direction on a vehicle width direction side,
a side frame part having a frame side wall part arranged inside the side support part,
the side airbag apparatus including an airbag for restraining a passenger when expanded and deployed and in inflator for supplying expansion gas to the side airbag,
the side airbag comprises: a first chamber which houses the inflator and is deployed outside in a vehicle width direction of the frame side wall part; a second chamber which is deployed inside in the vehicle width direction of the frame side wall part with respect to this first chamber; and an internal expanding part which is arranged in the second chamber, and expands at least on a rear side of the vehicle in the second chamber via the gas flowing out from the first chamber,
wherein the first chamber is deployed such that at least a portion thereof laterally overlaps the frame side wall part, and
wherein the second chamber is configured to be expandable via gas flowing out from the internal expanding part,
wherein
the internal expanding part is a cylindrically molded member, and
wherein upper and lower ends of the cylindrically molded member open inside the second chamber.

11. The passenger protection apparatus according to claim 1, wherein a non-expanding region fixed to the frame side wall part is formed in the internal expanding part.

12. The passenger protection apparatus according to claim 1, wherein a rear end part of an expanding region of the second chamber is disposed in front of a rear end part of the first chamber.

13. A side airbag apparatus equipped with the passenger protection apparatus according to claim 1.

14. The passenger protection apparatus of claim 10, wherein the cylindrically molded member is a cylindrically molded inner tube.

* * * * *